(12) United States Patent
Abramovitch et al.

(10) Patent No.: US 7,768,738 B2
(45) Date of Patent: Aug. 3, 2010

(54) MITIGATING THE EFFECTS OF DISTURBANCES OF A DISK DRIVE

(75) Inventors: Daniel Yves Abramovitch, Palo Alto, CA (US); George Hsu, San Jose, CA (US)

(73) Assignee: Sensor Platforms, Inc., San Jose, CA (US)

( * ) Notice: Subject to any disclaimer, the term of this patent is extended or adjusted under 35 U.S.C. 154(b) by 217 days.

(21) Appl. No.: 11/983,895

(22) Filed: Nov. 13, 2007

(65) Prior Publication Data
US 2009/0122439 A1    May 14, 2009

(51) Int. Cl.
G11B 5/596    (2006.01)
(52) U.S. Cl. .................................... 360/77.03
(58) Field of Classification Search ........................ None
See application file for complete search history.

(56) References Cited

U.S. PATENT DOCUMENTS

| | | | |
|---|---|---|---|
| 4,040,103 A | 8/1977 | White | |
| 5,235,472 A | 8/1993 | Smith | |
| 5,299,075 A | 3/1994 | Hanks | |
| 5,426,545 A | 6/1995 | Sidman et al. | |
| 5,521,772 A * | 5/1996 | Lee et al. ...................... | 360/75 |
| 5,663,847 A | 9/1997 | Abramovitch | |
| 5,801,311 A | 9/1998 | Duell et al. | |
| 5,856,895 A | 1/1999 | Schaenzer et al. | |
| 6,414,813 B2 | 7/2002 | Cvancara | |
| 6,496,320 B1 | 12/2002 | Liu | |
| 6,580,579 B1 | 6/2003 | Hsin et al. | |
| 6,597,532 B1 * | 7/2003 | Usui et al. ............... | 360/97.03 |
| 6,665,633 B2 | 12/2003 | Fioravanti et al. | |
| 6,674,600 B1 * | 1/2004 | Codilian et al. ............... | 360/75 |
| 6,898,046 B2 | 5/2005 | Sri-Jayantha et al. | |
| 6,914,743 B1 | 7/2005 | Narayana et al. | |
| 6,952,318 B1 * | 10/2005 | Ngo ........................... | 360/69 |

(Continued)

FOREIGN PATENT DOCUMENTS

EP    0264535    5/1987

OTHER PUBLICATIONS

Abramovitch, D., "Rejecting Rotational Disturbances on Small Disk Drives Using Rotational Accelerometers,"IFFAC, 1996, pp. 483-488.

(Continued)

*Primary Examiner*—Hoa T Nguyen
*Assistant Examiner*—James L Habermehl
(74) *Attorney, Agent, or Firm*—Brian R. Short

(57) ABSTRACT

Embodiments of mitigating the effects of disturbances of a disk drive are disclosed. One method includes sensing a position error signal of a transducer coupled to a surface of the disk drive, wherein the position error signal aids in control of an actuator of the disk drive. A first disturbance signal is generated by sensing a disturbance of a first sensor attached to the disk drive, wherein the first disturbance signal aids in control of the actuator. A second disturbance signal is generated by sensing a disturbance of a second sensor attached to the disk drive, wherein the second disturbance signal aids in control of the actuator. Effects of the disturbances on the position error signal are reduced by adaptively adjusting a gain of the first disturbance signal and a gain of the second disturbance signal.

25 Claims, 13 Drawing Sheets

U.S. PATENT DOCUMENTS

| | | | |
|---|---|---|---|
| 6,963,463 | B2 | 11/2005 | Sri-Jayantha et al. |
| 7,035,034 | B2 * | 4/2006 | Semba et al. ............ 360/77.03 |
| 7,162,352 | B1 * | 1/2007 | Nishioka .................... 701/74 |
| 2007/0030768 | A1 | 2/2007 | Semba et al. |
| 2007/0217052 | A1 | 9/2007 | Semba et al. |

OTHER PUBLICATIONS

Abramovitch, D., "Rejecting Rotational Disturbances on Small Disk Drives Using Rotational Accelerometers,"Control Eng. Practice, vol. 5, No. 11, 1997, pp. 1517-1524.

Jinzenji et al., Acceleration Feedforward Control Against Rotational Disturbance in Hard Disk Drives, Mar. 2001, IEEE Transactions on Magnetics.

Kempf et al, Comparison of Four Discrete-Time Repetitive Algorithms, 1993, IEEE Control Systems.

White et al., "Improved Track Following in Magnetic Disk Drives Using a Disturbance Observer", Mar. 2000, IEEE,ASME Transactions of Mechantronics.

White et al., Increased Disturbance Rejection in Magnetic Disk Drives by Acceleration Feedforward Control, 1997, Control Engineering Practice.

Baek et al., "Vibration Rejection Control for Disk Drives by Acceleration Feedforward Control", 1999, Conference on Decision and Control.

Abramovitch, "Rejecting Rotational Disturbances on Small Disk Drives Using Rotational Accelerometers", 1997, Control Engineering Practice.

White et al., "Increased Disturbance Rejection in Magnetic Disk Drives by Acceleration Feedforward Control and Parameter Adaptation", 1997, Control Engineering Practice.

Davies et al., "Active Compensation of Shock, Vibration, and Windup in Disk Drives", 1993, ASME Press.

* cited by examiner

MITIGATING THE EFFECTS OF DISTURBANCES OF A DISK DRIVE

FIELD OF THE DESCRIBED EMBODIMENTS

The described embodiments relate generally to disk drives. More particularly, the described embodiments relate to a method and apparatus for mitigating the effects of disturbances of disk drives.

BACKGROUND

Servo systems of disk drives control a radial position of a transducer coupled to the disk in an attempt to keep the transducer over the center of a pre-selected track of the disk. In a disk file system this is done as the transducer reads position information from the track in the surface of the disk as the disk rotates. For an embedded or sectored servo system the position information is obtained from inter sector information placed at predetermined locations on the tracks of the disk. The position information is then used to develop a position error signal (PES). The PES is fed back through a compensator into a drive motor for the transducer actuator to move the transducer in a direction to reduce the error from the desired position within any given track. Typically, the desired position is the geometric center of the track with the PES value increasing as a positive value in one direction from the center and as a negative value in the other.

The servo systems include a feedback servo loop (head actuator loop). The PES is coupled into the head actuator loop and is the primary means by which the head actuator is maintained in the desired position over the center of a selected track. Although the aforementioned feedback servo loop in combination with the PES can adequately maintain the position of the head actuator in most use situations, mechanically induced disturbances or displacements of the disk drive, however, cannot be totally eliminated because of the finite response time and finite gain of the feedback servo loop correcting for these disturbances or displacements. A finely balanced mechanical actuator can be used to desensitize rotary actuator disk drives to translational disturbances by means of directing the translational disturbances solely through the center of the pivot point of the actuator. This creates a zero length moment arm about the pivot point which results in no net torque or angular forces to disturb the actuator to push it out of position when a purely translational disturbance is applied. This is true to a first order as slight imbalances, the stiffness of actuator connector wires, and pivot bearing stiffness contribute to some translational sensitivity, but this is relatively small in comparison to the sensitivity to rotational disturbances. However, in order to access data, the actuator must be able to pivot freely with minimal bearing friction. Because of this, the actuator is susceptible to rotary disturbances. Such disturbances either rotate the head away from the track center or rotate the track center away from the head. Either of these results in a net increase in the position error signal (PES) sensed by the read/write head. Such effects result in the unreliable reading and writing of data to and from the desired tracks on a disk drive. Thus, when the head is forced sufficiently off track—typically from 8% to 15% of the track width—the reading and writing of data is discontinued.

Several important trends within the data storage industry have made the effects of rotational disturbances increasingly severe wherein a cost effective solution is more important than ever before. The rise in availability, density, and cost effectiveness of Electrically Erasable Programmable Read Only Memory (EEPROM) has hastened the need to be able to add increased storage capacity to disk drive products with no room for commensurate cost or physical size increases. Thus the materials used to construct all critical components of a disk drive, from storage platters to actuators and mechanical structures must be both lower cost, and often lighter as well. Such design requirements generally lead to less rigidity and more susceptibility to mechanical disturbances that are only partially mitigated by the shrinking of the drive dimensions. Also, the traditional means of generating more storage capacity on disk drives has been to pack more tracks of data onto disks of the same or smaller size. More tracks on a disk leads to a higher number of Tracks Per Inch (TPI) and thus increasingly narrow track widths which makes accurate alignment over track centers significantly more challenging for an unassisted servo system. Since EEPROM is an entirely semiconductor-based technology, it does not suffer from issues related to mechanical disturbances and so, to be competitive, disk drives must also mitigate its performance disadvantages due to mechanical disturbances as well.

With the improvement in read/write heads and the commensurate increase in areal densities the requirement for tracking accuracy is constantly increasing. With finer track widths comes an increased susceptibility to both internal and external disturbances. While improving the drive feedback loop can improve susceptibility to issues that include—but are not limited to—spindle harmonics, PES noise, and disturbances due to air flow, the finite sample rate of the control system and the system resonances limit the bandwidth of the closed-loop system. Thus, for external disturbances, especially rotational shock and vibration, auxiliary sensors are often necessary to provide the needed disturbance rejection and maintain tracking fidelity.

Because most disk drives use the sectored servo method of generating the PES, there is a direct trade-off between the space allocated for user data and that allocated to record position information. Thus, to increase the performance of the servo control loop solely by means of adding more PES sectors comes at a direct cost to the available space for user data storage.

Finally, two of the largest markets for data storage are mobile computing (including laptops, portable communications, gaming and navigation devices) and corporate data centers. The susceptibility of mobile disk drives to the mechanical disturbances of shocks and bumps are fairly obvious. However, the requirements of corporate datacenters are for applications that run the gamut from corporate databases (for enterprise management software to regulatory document storage for audit compliance) to search engines, to video sharing internet sites. The efficiency of these centers is directly tied to the ability to constantly read and write data to the disk drives in the center. It is in these high volume data storage applications where multiple disk drives are ganged into server boxes where the effects of mutual coupling of disk drive operations such as seeks and spindle wobble create disturbances that cause severe degradation in the throughput of its neighboring drives. Finally, as disk drive track densities increase, the issues of shock and vibration become more significant for the commodity drives in desktop and laptop computers as well.

One possible solution includes the use of a monolithic rotational accelerometer to sense rotational shock and vibration of the disk drive. The rotational accelerometers generate a signal which can be used as a feedforward controller to the servo loop for making the disk drive more robust to shock and vibration. However, because of the continual push to reduce the manufacturing costs of disk drives, monolithic rotational accelerometers are impractical for such a cost sensitive, high volume application due to their relatively high cost. Monolithic rotational accelerometers are relatively expensive because they are extremely difficult to manufacture. This is true for all such sensors in general, but especially so for MEMS rotational accelerometers as they are fabricated on silicon wafers. Because rotational accelerometers seek to provide a perfectly balanced output that is immune to translational forces, their construction is very difficult. For the MEMS variety, the additional complexity involved in the masking and etching process of the silicon wafers used in their fabrication creates asymmetries which cause all but a few of the fabricated accelerometers to exhibit non-balanced outputs susceptible to translational accelerations. There are analogous difficulties involved in the fabrication of the non-MEMS varieties of rotational accelerometers as well.

In addition, rotational accelerometers suffer from poor sensitivity because the acceleration sensing structures are in such close proximity to each other. This is problematic because rotation is best sensed along the largest possible diameter about a given center of rotation. Finally, rotational accelerometers require factory calibration in order to provide a known gain in response to a specific rotational input as well as to provide true rejection of linear acceleration. This calibration step also adds significant cost to the devices and also becomes a significant production bottleneck when large volumes must be produced.

Another type of sensor which can be employed is a single-axis linear-translation accelerometer, both of MEMS and non-MEMS varieties. These sensors are designed to be sensitive to only linear acceleration along their axis of sensitivity and do not respond to angular acceleration when the axis of rotation passes through the center of the sensor. They are much less expensive and simpler to fabricate than their rotational counterparts. It is well known in the art that two linear accelerometers can be configured to measure rotational accelerations by arranging them parallel to each other on opposing tangents of a circle of rotation about a desired point of rotation. When arranged in this manner the difference of their signals yields pure rotation while the sum yields pure translation. If the sensors are arranged in an anti-parallel configuration, then the sum of their signals yields rotation while their difference yields translation. The terms "combination" or "combining" are occasionally used to mean either a difference or a sum, or the act of their calculation, which yields the desired result of either rotation or translation depending upon the specific polarities of the sensor outputs wherein a number of factors could impact the net polarity of said sensor outputs.

The advantage of using linear accelerometers for rotational acceleration measurement is that they are low cost and also, depending upon the pair's separation distance, can create relatively large signal output levels in response to a rotational acceleration. This greatly enhances their usability, especially when the rotational stimulus is small.

In order for linear accelerometers to be used effectively for angular acceleration measurements in the paired configuration, their respective gains must be well matched, otherwise there is an incomplete separation between rotational and translational acceleration components. The offsets of the accelerometers can be easily compensated for by the electrical drive circuitry, and therefore, are not addressed. Even the most expensive and well-produced linear accelerometers typically vary in gain by up to +/−15% from sensor to sensor. The gain mismatch between low cost sensors can be even greater. This leads to significant errors in measured angular acceleration when using such linear accelerometers, especially when there is a presence of translational acceleration as well. In addition to the actual sensor gain mismatches, there is a significant influence to measured accelerations depending upon how and where the sensors are actually mounted to the disk drive. For instance, if one sensor is mounted closer to a housing feature, such as a screw or a mounting boss, the transfer of acceleration to the measuring sensor can be either amplified or attenuated compared to its partner. This means that even if a pair of linear accelerometer sensors were perfectly calibrated at the factory prior to installation into the disk drive, by the time they are mounted, their effective gains would again be mismatched.

It is desirable to have a low-cost, easy to implement method and apparatus for compensating for disturbances of a disk drive.

SUMMARY

An embodiment includes a method of mitigating effects of disturbances of a disk drive. The method includes sensing a position error signal of a transducer coupled to a surface of the disk drive, wherein the position error signal aids in control of an actuator of the disk drive. A first disturbance signal is generated by sensing a disturbance of a first sensor attached to the disk drive, wherein the first disturbance signal aids in control of the actuator. A second disturbance signal is generated by sensing a disturbance of a second sensor attached to the disk drive, wherein the second disturbance signal aids in control of the actuator. Effects of the disturbances on the position error signal are reduced by adaptively adjusting a gain of the first disturbance signal and a gain of the second disturbance signal.

Another embodiment includes a method of calibrating at least a pair of sensors of a disk drive. The method includes sensing a position error signal of a transducer coupled to a surface of the disk drive, wherein the position error signal aids in control of an actuator of the disk drive. A first disturbance signal is generated by sensing a disturbance of a first sensor attached to the disk drive, wherein the first disturbance signal aids in control of the actuator. A second disturbance signal is generated by sensing a disturbance of a second sensor attached to the disk drive, wherein the second disturbance signal aids in control of the actuator. A relative gain between the first disturbance signal and the second disturbance signal is adaptively adjusted and a response of the position error signal is measured.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide methods and systems for reducing the effects of disturbances of disk drives. The described embodiments include sensors that detect disturbances of the disk drives. The described embodiments compensate for mismatches of sensor gains, thereby allowing the use of low-grade sensors. That is, the described embodiments provide sensing and mitigation of the disturbances, that can utilize low-grade, low-cost sensors.

The more effectively the described embodiments adapt to sensor gain mismatches, the lower the quality and cost the type of linear accelerometer that can be used for disk drive disturbance mitigation. There exists a class of linear rate sensors that disk drives currently use as shock sensors. The linear rate sensors operate on the basis of a proof mass attached to a piezo-electric base material and are exceptionally low cost. These types of piezo-electric shock sensors can only measure the time rate of change of acceleration and cannot measure constant accelerations such as gravity. Because of their low cost construction, they are generally only used for gross measurements such as shock. The described embodiments allow the use of such poor performance and exceptionally low cost accelerometer sensors for the reduction of disturbances of disk drives.

It should be noted that the same techniques herein described can easily be applied to also allow unbalanced and uncalibrated monolithic rotational accelerometers to be used effectively to reduce the effects of rotational disturbances on disk drives as well. The rotational sensor needs to have separate outputs for its separate sensor halves, such that the described embodiments are able to treat the monolithic rotational accelerometer as two electrically separate accelerometer sensors. This is, in fact, exactly how such rotational accelerometers actually function and are constructed, as it is usually the sensor's embedded drive electronics which internally combines the electrical signals of the two separate sensor halves into one single output signal for use by the user. Many rotational sensors are already designed to have such a dual output format, and the ones that don't can be easily modified to do so, enabling them to operate with the described embodiments for hard disk drive disturbance correction.

Figure 1:
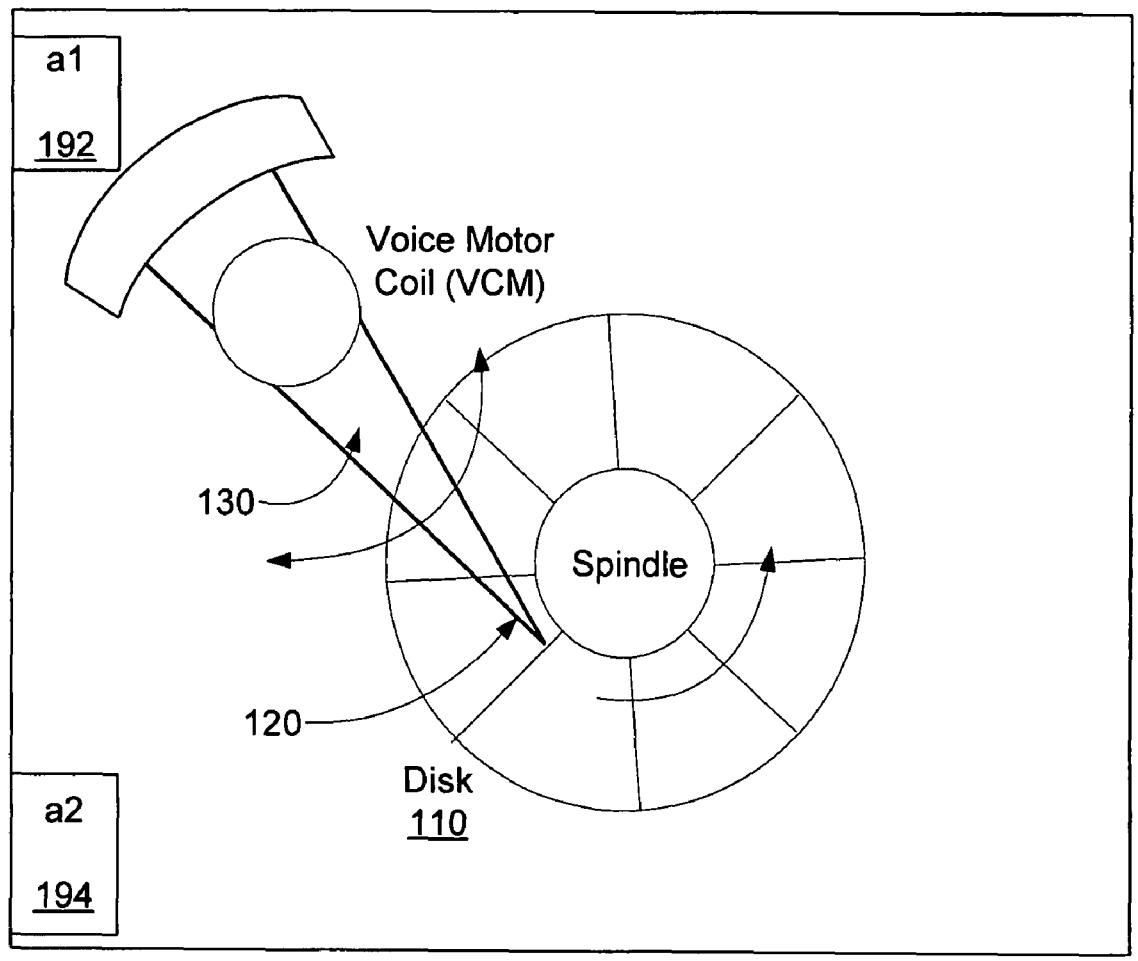
FIG. 1 shows an example of a top-view of disk drive that can utilize embodiments of reducing the effects of rotational and/or translational disturbances.

FIG. 1 shows an example of a disk drive that can utilize embodiments of mitigating the effects of rotational and translational disturbances. As shown, the disk drive includes a disk 110 that rotates in a plane. A read/write head 120 floats on an air bearing entrained around the disk 110 by air flow and suspension of an actuator 130. A positions error signal (PES) is read from the disk 110, and used to drive a control loop that controls the position of the head 120 over the surface of the disk 110.

The disk drive includes a pair of disturbance sensors 192, 194. Disturbance signals generated by the sensors 192, 194 can be injected into the control loop providing additional control of the actuator 130. As will be described, the disturbance sensors 192, 194 can be inexpensive linear accelerometers. These accelerometers are used to provide feedforward signals to the control loop based upon rotational disturbances to cancel the effects of disturbances on the PES.

Figure 2:
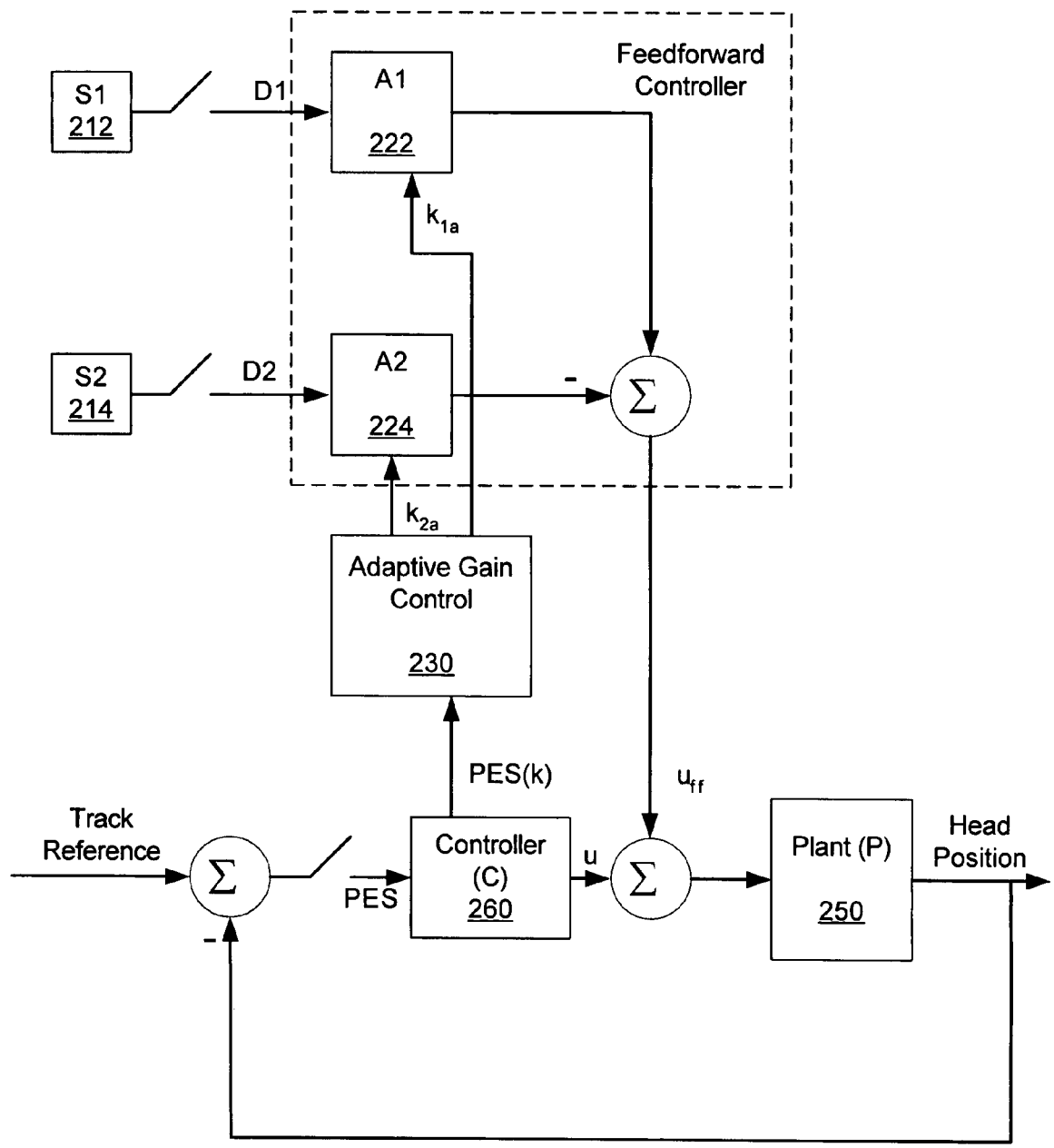
FIG. 2 shows an example block diagram of a control system that can be used to implement embodiments for mitigating the effects of disturbances of a disk drive.

FIG. 2 shows an example of a block diagram of a control system that can be used to implement embodiments for mitigating the effects of disturbances of a disk drive. As will be described, the disturbances can be rotational and/or translational. As previously described, the control system includes a PES disk drive control loop that mitigates, at least to some extent, translational disturbances of the disk drive. An exemplary disk drive control loop includes a plant (P) block 250, and a controller (C) block 260. The P block 250 represents the physical system to be controlled and is often referred to as the "plant". For disk drive applications, the P block 250 typically represents the rotary actuator of the drive and associated dynamics of the read/write head. The C block 260 represents the controller and provides the mechanism in which the PES is turned into an input adjustment to the physical system. The PES control of the disk drive control loop, however, does not provide acceptable mitigation of rotational disturbances of the disk drive.

As shown, the control system includes sensors 212, 214 that sense disturbances of the disk drive. The sensors 212, 214 can be, for example, accelerometers. However, the sensors can be any device that generates a signal that represents a detected disturbance of the sensors, and therefore, the disk drive. Examples of devices that can be used as the sensors 212, 214 includes MEMS capacitive linear accelerometers, piezo-resistive linear accelerometers, MEMS load sensors in conjunction with proof masses, MEMS pressure sensors with proof masses attached, non-MEMS bulk linear accelerometers, and even low cost shock sensors, These represent some but not all types of such disturbance sensors.

The embodiments described provide disk drive disturbance mitigation that allows the sensors 212, 214 to be implemented using low-quality, low-cost sensors. More specifically, the described embodiments can compensate for mismatches of gains of the sensors, thereby allowing the embodiments to use lower quality sensors than embodiments that do not compensate for such gain mismatches. This is advantageous because low-quality sensors typically cost less. The sensors can be oriented to allow estimation of both rotational and translational disturbances of the disk drive. The embodiments described may refer to the sensors as accelerometers, but it is to be understood that the described embodiments can be implemented with other types of disturbance sensors, an example of which is shock sensors. Once again, shock sensors do not directly measure acceleration but rather the time rate of change of acceleration.

The control system includes gain elements 222, 224 that adaptively adjust gains of the disturbance signals D1, D2 generated by the sensors 212, 214. The gain adjusted disturbance signals are summed and injected into the disk drive control loop to provide additional mitigation of the effects of the disturbances. In one embodiment, an auxiliary control signal is generated by combining the first disturbance signal and the second disturbance signal. The auxiliary control signal is injected into the drive control loop of the disk drive for aiding in control of the actuator. It would be apparent to one of ordinary skill in the art that such an auxiliary control signal is not the sole means to mitigate the effects of disturbances. The embodiments described and shown by example can also easily be implemented entirely inside of a controller (C), block 260, wherein the disturbance mitigation adjustments could be made and combined internally to form a single compensated output control signal.

The gains of the gain elements 222, 224 are adaptively adjusted (controls $k_{1a}$, $k_{2a}$) so that mismatches of the gains of the sensors 212, 214 are minimized. This is accomplished by adaptively adjusting the gains of the gain elements 222, 224 to de-correlate the position error signal with respect to rotational disturbance and translational disturbance of the disk drive. As will be described, the gain of the first disturbance signal and the gain of the second disturbance signal are adaptively adjusted in response to an estimated rotational component of the first and second disturbance signals as separated from an estimated translational component of the first and second disturbance signals as determined by a response of the position error signal to the disturbances.

An adaptive gain control block 230 is included within FIG. 2 to represent the adaptive control of the gain elements 212, 214 that is dependent upon the sensed disturbance signals D1, D2 and the PES.

Figure 3:
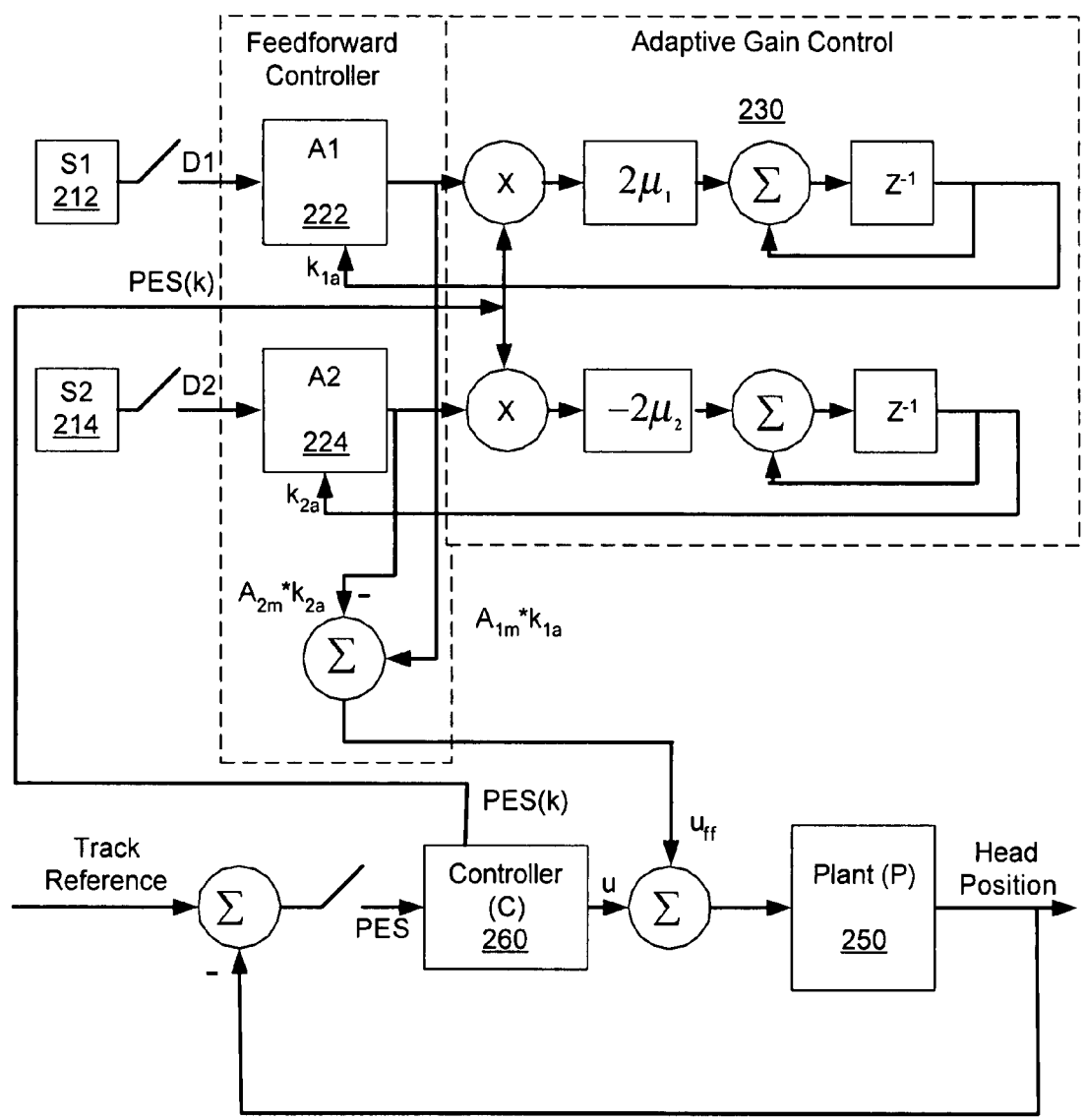
FIG. 3 shows an example of an embodiment of the adaptive gain control of FIG. 2.

FIG. 3 shows an example of an embodiment of the adaptive gain control 230 of FIG. 2. The gains (A1, A2) which scale the disturbance signals (D1, D2) to form a feedforward control signal ($u_{ff}$) are adjusted as shown in FIG. 3. The adjustment mechanism shown is a simple Least Mean Squares (LMS) algorithm of Widrow and Hoff. However, any gain adaptation algorithm can be used. The disturbance signal is multiplied by the PES and is then processed according to an integration algorithm. The resulting gain output from the integral is scaled in relation to the correlation between the disturbance and the uncompensated PES signal.

Figure 4:
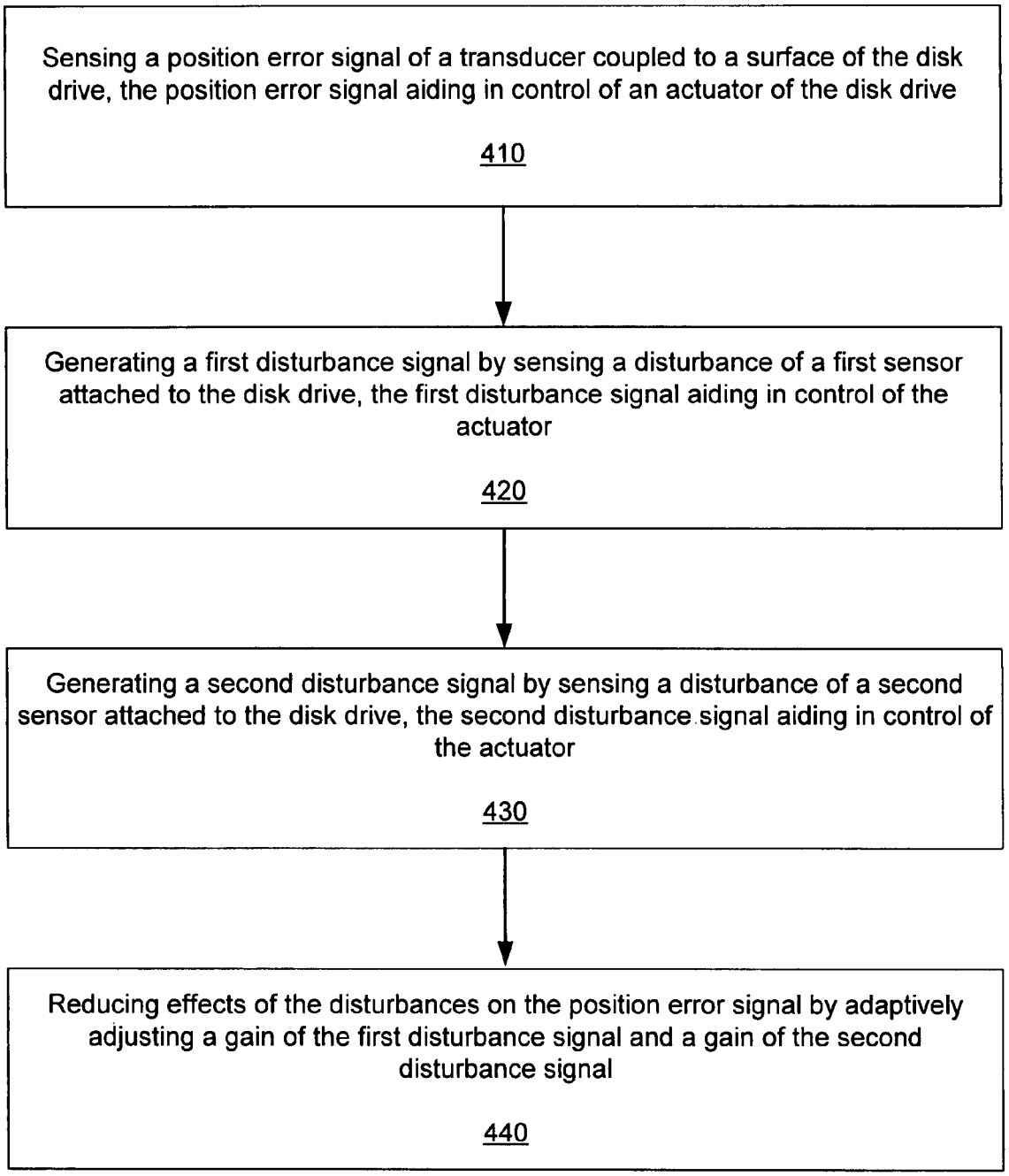
FIG. 4 is a flow chart that shows one example of steps of a method of mitigating the effects of disturbances of a disk drive.

FIG. 4 is a flow chart that shows one example of steps of a method of mitigating effects of disturbances of a disk drive. A first step 410 includes sensing a position error signal of a transducer coupled to a surface of the disk drive, wherein the position error signal aids in control of an actuator of the disk drive. A second step 420 includes generating a first disturbance signal by sensing a disturbance of a first sensor attached to the disk drive, wherein the first disturbance signal aids in control of the actuator. A third step 430 includes generating a second disturbance signal by sensing a disturbance of a second sensor attached to the disk drive, wherein the second disturbance signal aids in control of the actuator. A fourth step 440 includes reducing effects of the disturbances on the position error signal by adaptively adjusting a gain of the first disturbance signal and a gain of the second disturbance signal.

For an embodiment, reducing effects of the disturbances on the position error signal includes adaptively adjusting a gain of the first disturbance signal and a gain of the second disturbance signal in response to an estimated rotational component of the first and second disturbance signals as separated from an estimated translational component of the first and second disturbance signals as determined by a response of the position error signal to the disturbances. The gains are adaptively adjusted so that the effect of the rotational component of the sensed disturbances on the position error signal is reduced. That is, the gains are adjusted to reduce mismatches between the gains of the disturbance signals.

In a further embodiment, an auxiliary control signal can be generated by combining the first disturbance signal and the second disturbance signal. The auxiliary control signal is injected into the drive control loop of the disk drive external to the Controller (C) and aids in control of the actuator. Additionally, should such an auxiliary control signal, or its digital equivalent inside controller (C), be used, the overall gain can also be adjusted once the rotational component of the sensed disturbance signal has been properly measured and calculated by means of having the gains of the first and second disturbance signals adequately matched.

An embodiment includes reducing effects of translational disturbances on the position error signal by adjusting a relative gain between the first disturbance signal and the second disturbance signal. Effects of rotational disturbances on the position error signal are reduced by adjusting an overall gain of the first disturbance signal and the second disturbance signal. These adjustments can be implemented by adaptively adjusting the gain of the first disturbance signal by monitoring an output of the first sensor, and adaptively adjusting the gain of the second disturbance signal by monitoring an output of the second sensor.

For an embodiment, the first sensor includes a first accelerometer sensing a first acceleration and the second sensor includes a second accelerometer sensing a second acceleration. This embodiment further includes estimating the rotational acceleration signal from the first acceleration signal and the second acceleration signal, and estimating the translational acceleration signal from the first acceleration signal and the second acceleration signal. Effects of the disturbances on the position error signal are reduced by de-correlating the position error signal with respect to the rotational disturbance and translational disturbance by adaptively adjusting the gain of the first acceleration signal and adaptively adjusting the gain of the second acceleration signal. As previously described, an auxiliary control signal can be generated by combining the first acceleration signal and the second acceleration signal, and the auxiliary control signal is injected into the drive control loop of the disk drive for aiding in control of the actuator.

An embodiment includes the sensors, or more specifically, the accelerometers being a pair of linear accelerometers. The accelerometers can be physically displaced, oriented in the same direction, and placed at tangents to a circle along its diameter with the desired axis of rotation as its center. It should also be noted that the described embodiments do not require that the pair of accelerometers be located perfectly about the center of the desired axis of rotation in order to still be functional. The rotational acceleration signal can be estimated based on a scaled difference between the first acceleration signal and the second acceleration signal (assuming that the accelerometers are oriented in the same direction and the scaling coefficients are positive), and the translational acceleration can be estimated based on a scaled sum of the first acceleration signal and the second acceleration signal (again, assuming that the accelerometers are oriented in the same direction and the scaling coefficients are positive). It is to be understood that the orientation of the sensors relative to each other, and the polarity of the scaling coefficients can change whether the first and second acceleration signals are summed or subtracted from one another. It is also to be understood that other configurations and orientations of the sensors can be utilized by the described embodiments while still realizing the same effective result. There always exists some simple additive or subtractive combination of the accelerometer signals which will yield the desired values of the rotational and translational components of the disturbance depending upon the actual polarities of the sensor outputs. Thus the actual polarities of the sensor outputs can be easily accounted for by one of ordinary skill in the art and in no way should detract from the described embodiments.

As will be described, an embodiment includes matching a response of the position error signal to the first and second disturbance signals by filtering the first and second disturbance signals of the first and second sensor before the first and second disturbance signals are gain adjusted.

As described, the first and second disturbance signals aid in control of the actuator through an adaptive feedforward control loop, and the position error signal aids in control of the actuator through a feedback control loop. This embodiment can additionally include the adaptive feedforward control loop of the disk drive being implemented with analog circuitry.

In some situations, analog adaptive circuits have several advantages over digital adaptive circuits for implementing the feedforward control circuitry. Analog adaptive circuits can consume less power because there is no need for analog to digital converters (ADC) or digital to analog converters (DAC) as well as no need for the clock circuits necessary to drive these devices, which would be necessary in a mixed analog and digital circuit approach. Furthermore, without the digital clock of a mixed signal circuit, the noise performance of the circuit is typically better and allows for better performance of the sensors and overall system.

Additionally, such an analog adaptive circuit approach would be significantly less expensive, due to the reduced cost realized by eliminating the requirement for ADC and DAC conversion circuits which would be required for the data interfacing between the analog and digital portions of circuits. This is because in a pure analog implementation there would be no requirements for ADC's or DAC's to convert the signals from the analog domain into the digital domain for processing and then back into the analog domain for control.

An additional advantage is that the sample rate of an analog adaptive circuit is not artificially constrained. Therefore, theoretically, the speed of the analog circuit is only constrained by the device response times. The devices operate in their linear regions instead of in saturation, and therefore, operate faster.

Therefore, an adaptive analog circuit can be designed that does the feedforward compensation. The accelerometers should be followed by an equalizing filter. The feedforward signal is then formed by a combination of the analog filtered acceleration signals using analog circuits that have gains adjusted by the analog adaptive loop. Because the gains are continuously adjusted, there are no sampling effects.

The described embodiments of mitigating the effects of disturbances of a disk drive can utilize threshold detection. That is, the control of the mitigation and/or the gain adaptation can be activated when some function of the sensed disturbance signals falls within a predetermined or user selectable range, for instance between upper and lower thresholds. For an embodiment, average amplitudes of the first and second disturbance signals are detected, and the gains of the first and second disturbance signals are adaptively adjusted only when the amplitudes are within a specified range. One example of a method of detecting the average amplitudes includes rectifying the first and second disturbance signals, and low-pass filtering the rectified first and second disturbance signals. Additionally, the feedforward loop can be controlled by the threshold detection. That is, an embodiment includes detecting average amplitudes of the first and second disturbance signals, and injecting the auxiliary control signal into a drive control loop of the disk drive only when the amplitudes are within a specified range.

Figure 5:
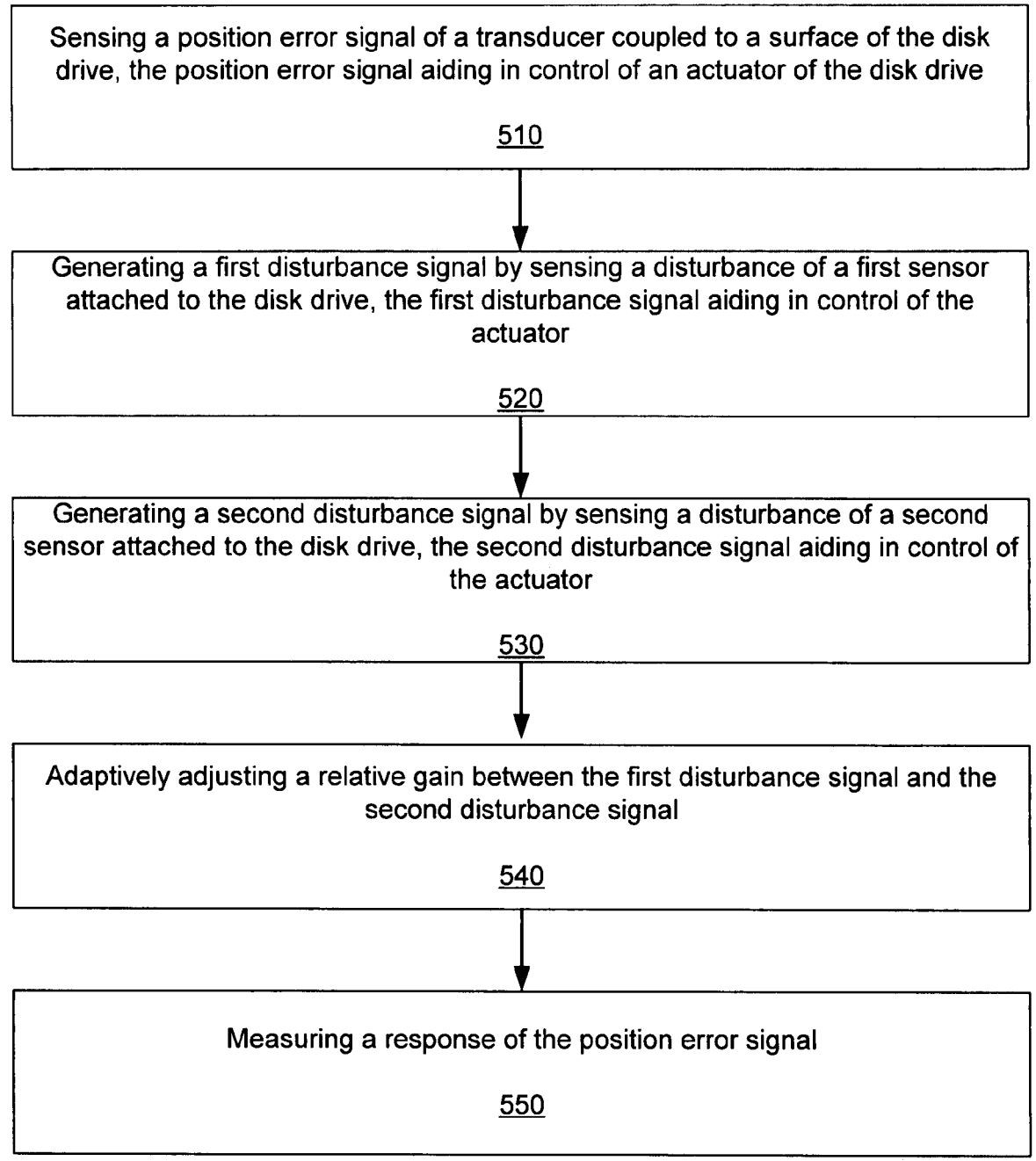
FIG. 5 is a flow chart that shows one example of steps of a method of calibrating at least a pair of sensors of a disk drive.

A feature of the described embodiments is a matching of gains of multiple disturbance sensors. FIG. 5 is a flow chart that shows one example of steps of a method of calibrating at least a pair of sensors of a disk drive. A first step 510 includes sensing a position error signal of a transducer coupled to a surface of the disk drive, the position error signal aiding in control of an actuator of the disk drive. A second step 520 includes generating a first disturbance signal by sensing a disturbance of a first sensor attached to the disk drive, the first disturbance signal aiding in control of the actuator. A third step 530 includes generating a second disturbance signal by sensing a disturbance of a second sensor attached to the disk drive, the second disturbance signal aiding in control of the actuator. A fourth step 540 includes adaptively adjusting a relative gain between the first disturbance signal and the second disturbance signal. A fifth step 550 includes measuring a response of the position error signal.

The gains of the pair of sensors are calibrated by adaptively adjusting a gain of the first disturbance signal and a gain of the second disturbance signal in response to an estimate of a rotational component of the first and second disturbance signals as separated from an estimate of a translational component of the first and second disturbance signals as determined by a response of the position error signal. As previously described, the gains are adaptively adjusted so that the effect of the rotational component of the sensed disturbances on the position error signal is reduced. The gains can also be adaptively adjusted so that the effect of the translational component of the sensed disturbance on the PES is reduced. That is, the gains are calibrated to reduce mismatches between the gains of the disturbance signals, and the total gain is adjusted. For an embodiment, the first sensor and the second sensor are aligned on a common translational axis, and sense translational disturbance.

After the sensors have been calibrated, a rotational disturbance signal is estimated by combining the first disturbance signal and the second disturbance signal. Effects of rotational disturbance are canceled by aiding control of the actuator with the estimated rotational disturbance signal by scaling the estimated rotational disturbance signal, and summing the scaled estimated rotational signal into a control loop of the disk drive. The position error signal is de-correlated with respect to the first disturbance signal and the second disturbance signal by adaptively adjusting the gain of the first disturbance signal and adaptively adjusting the gain of the second disturbance signal.

Figure 6:
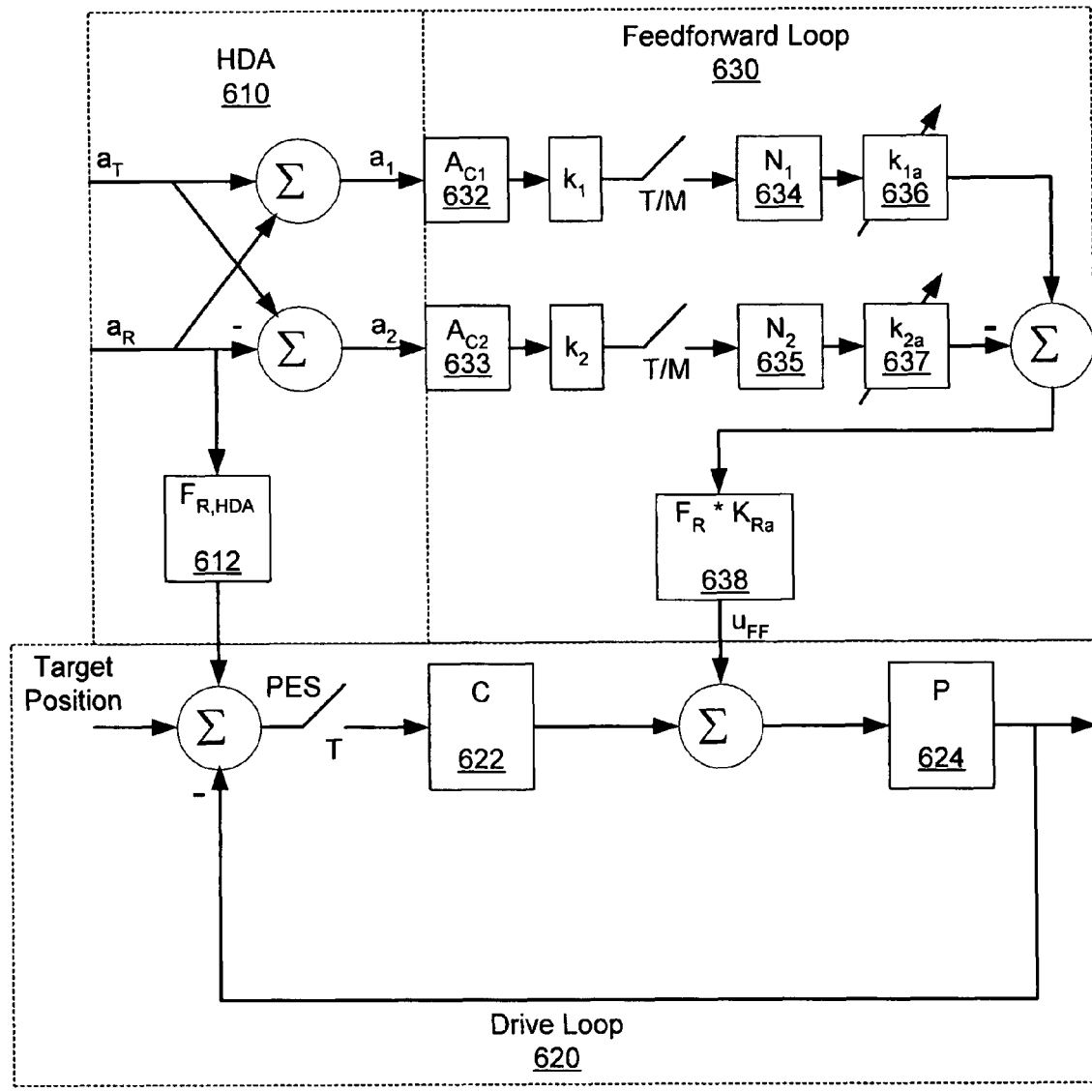
FIG. 6 shows an example of a more detailed block diagram of a control system that can be used to implement embodiments for mitigating the effects of disturbances of a disk drive.

FIG. 6 shows an example of a more detailed block diagram of a control system that can be used to implement embodiments for mitigating the effects of disturbances of a disk drive. The adaptive gain adjustment 230 is not shown in this FIG. 6, but is used to adjust the gains of gain elements $k_{1a}$ 636 and $k_{2a}$ 637.

Regardless of which form is used, there is a sign difference in the adaptive gain for each channel. This is due to the change in the gradient of PES with respect to each of the channels.

This embodiment includes a feedforward loop 630 that includes two adaptive loops. The two loops effectively calibrate the gains of two sensors $A_{C1}$ 632, $A_{C2}$ 633 relative to each other, and also relative to the disk drive. Therefore, the effects of mismatched gains of the sensors are reduced. Only two sensors are shown. However, it is to be understood that the embodiments provided can include any number of two or more sensors. The feedforward loop additionally includes filters $N_1$ 634, $N_2$ 635, and a rotational acceleration filter 638.

An HDA (head disk assembly) block 610 depicts, for example, translational acceleration $a_T$, rotational acceleration $a_R$, and shows influences of the two types of acceleration types on the feedforward loop 630, and the drive loop 620. For example, block 612 shows the influence forces have on the PES due to the rotational acceleration $a_R$. The summers within the HDA 610 show contributions of the translational acceleration $a_T$, and rotational acceleration $a_R$, to the disturbances sensed by the first sensor $A_{C1}$ 632 and the second sensor $A_{C2}$ 633.

A drive loop 620 includes previously described gain elements C 622 and P 624.

Gain elements $k_1$ and $k_2$ depict the gains of the first sensor $A_{C1}$ 632 and the second sensor $A_{C2}$ 633, which are generally assumed to be mismatched. Typical levels of mismatch from the literature are +/−15% difference between the two sensors. The switches depict sampling of the sensed signal with a sample period of T/M, where T is the sample period, of the PES and M is a multiple of the sample rate (For a given sample rate, $f_s$, the sample rate is related to the sample period, $T_s$, by $$f_S = \frac{1}{T_S}$$

). This allows the feedforward circuit to run at a different rate from the disk drive control loop. Often this rate is faster (M>1) since the accelerometers are not constrained by the multiplexing of user data with servo position information in the way that PES is. Each of the sensed disturbance signals are filtered by filters $N_1$ 634 and $N_2$ 635. The sampled and filtered disturbance signals are gain adjusted by adjustable gain elements $k_{1a}$ 636 and $k_{2a}$ 637. As previously described, the adaptive gain control of the adjustable gain elements $k_{1a}$ 636 and $k_{2a}$ 637 is not shown. The gain-adapted disturbance signals are combined to form a feedforward signal $U_{FF}$ that is summed into the drive loop. As is well known the in art, the feedforward signal $U_{FF}$ can (and in this particular embodiment, is shown to be) generated by an additional rotational disturbance gain and phase matching block $F_R*K_{Ra}$ 638. If a monolithic balanced-output rotational accelerometer that was calibrated to reject translational disturbances were to be used to mitigate disturbances of a disk drive, its influence on the control loop would be controlled by such a block 638 as well.

An embodiment includes the sensors 632, 633 being accelerometers and the gains of the sensed signals are adjusted to compute an estimate of the rotational acceleration of the disk drive. That is, estimates of the rotational and translational accelerations are generated from the two linear acceleration signals $a_1$ and $a_2$. The gains of the two feedforward loops are adapted. A mismatch in the relative gains of the two accelerometers results in the feedforward control signal having a parasitic sensitivity to translational acceleration. When stimulated by translational acceleration, as the translational loop affecting the drive converges, the two accelerometer gains are matched allowing the feedforward signal to be sensitive only to rotational accelerations of the drive.

Figure 7:
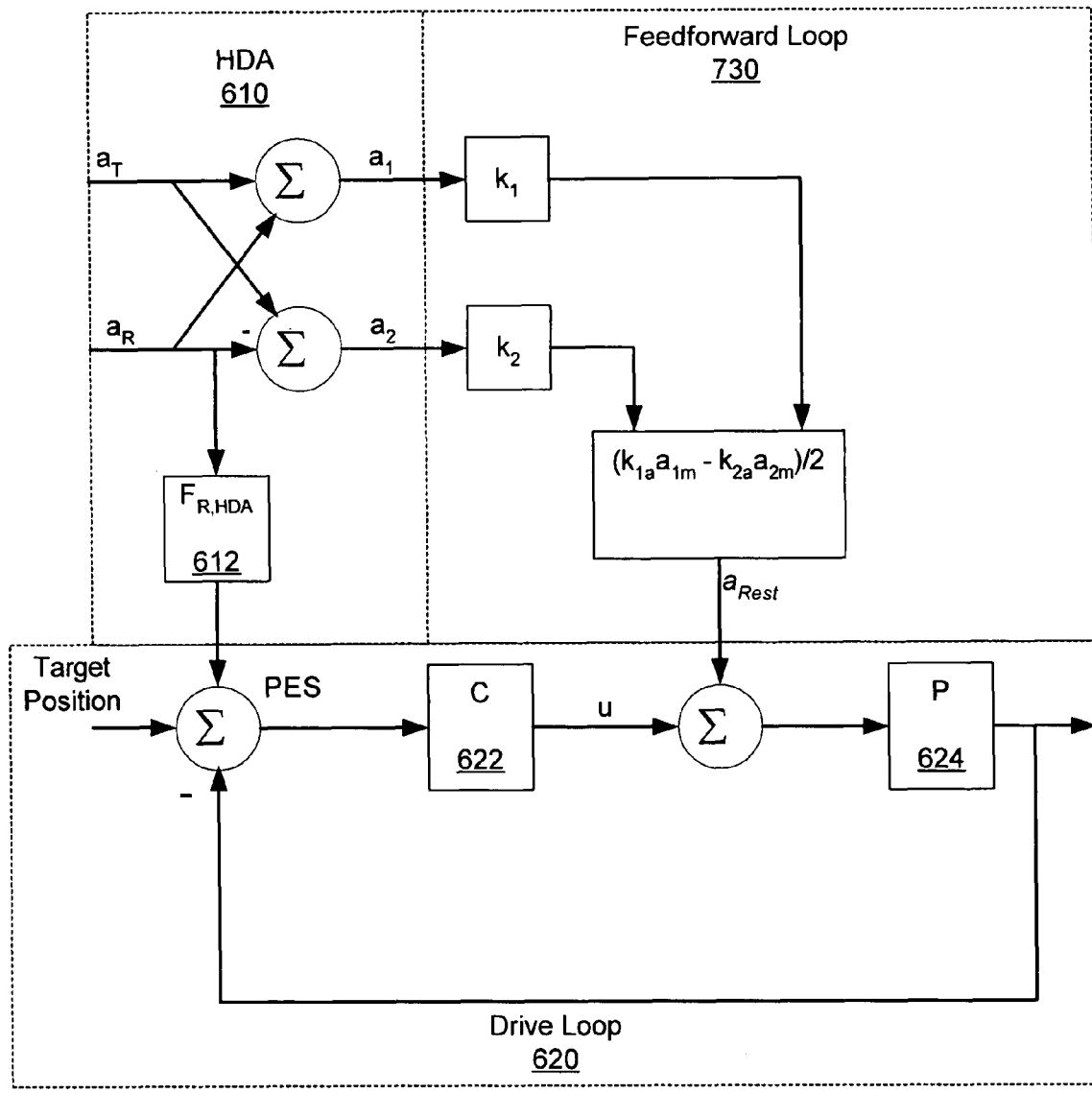
FIG. 7 shows an example of the block diagram of the control system that shows a simplified version of the feedforward loop.

FIG. 7 shows an example of the block diagram of the control system that shows a simplified version of the feedforward loop. More specifically, FIG. 7 assumes that the filters 634, 635 are matched. The block diagram of FIG. 7 assumes $$N_1 = \frac{F_{R,HDA}}{A_{C1}P},$$

$$N_2 = \frac{F_{R,HDA}}{A_{C2}P},$$

$F_R=1$, and $k_{Ra}=1$. Additionally, sampling issues are ignored.

Figure 8:
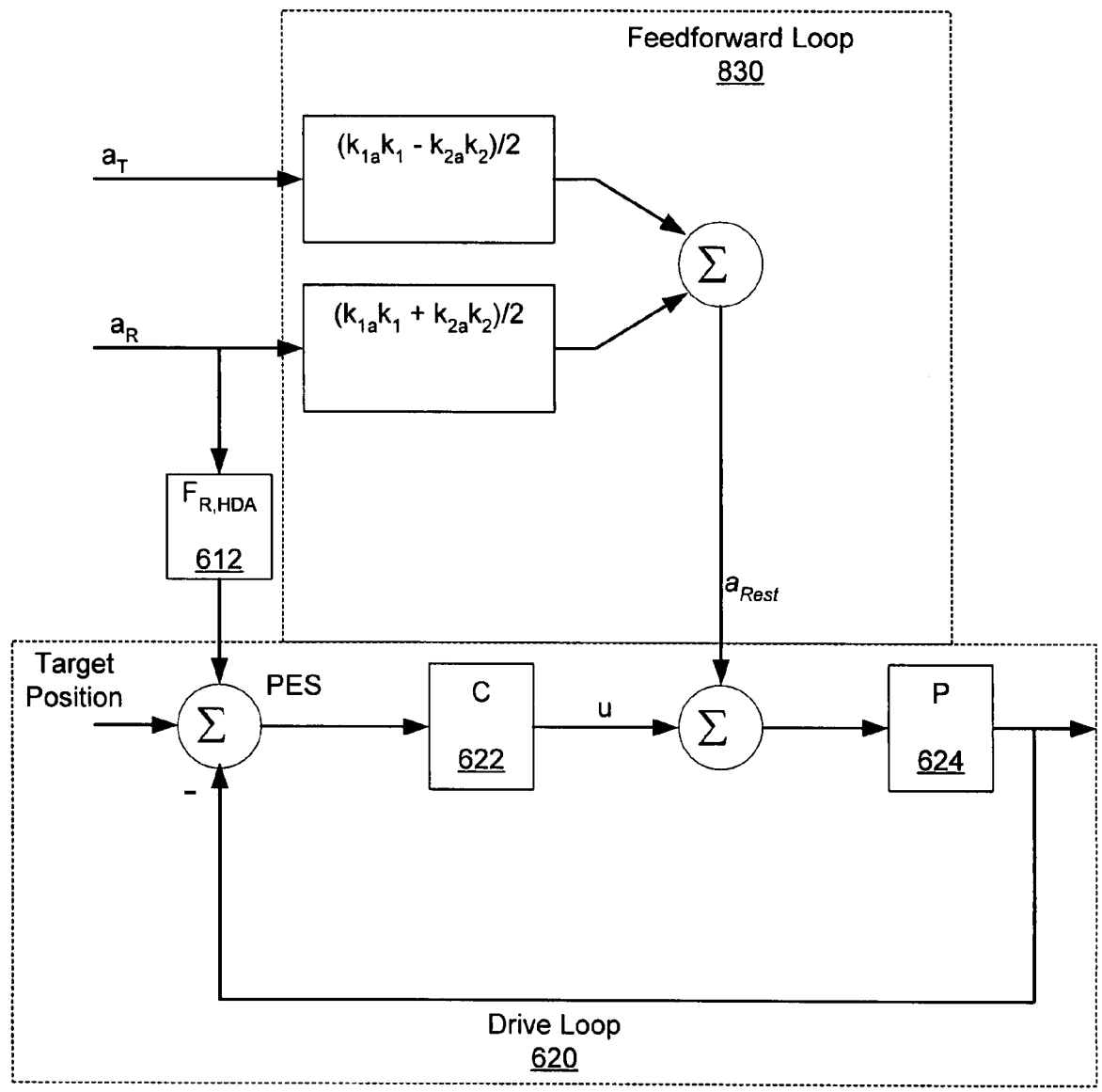
FIG. 8 shows an example of the block diagram of a control system that shows how mismatched gains effect how translational and rotational accelerations influence the drive loop.

FIG. 8 shows an example of the block diagram of the control system of FIG. 7 that shows how mismatched gains effect how translational and rotational accelerations influence the drive loop. Assuming the disturbance sensors are two accelerometers on a common (same) axis, and that the disk drive structure experiences translational acceleration perpendicular to that axis and rotationally, each of the accelerometers ideally senses:

$a_1=a_T+a_R$ and $a_2=a_T-a_R$, where $a_T$ is the translational acceleration and $a_R$ is the rotational acceleration. Assuming the sensed accelerations are ideal, then:

$$a_T = \frac{a_1 + a_2}{2} \text{ and } a_R = \frac{a_1 - a_2}{2}.$$

However, $a_1$ and $a_2$ are not accessible, but $a_{1m}=k_1 a_1$ and $a_{2m}=k_2 a_2$ where $k_1$, $k_2$ can be sensed. Reasonable estimates of $a_T$ and $a_R$ are:

$$a_{T,est} = \frac{k_{1a}a_{1m} + k_{2a}a_{2m}}{2} \text{ and}$$

$$a_{R,est} = \frac{k_{1a}a_{1m} - k_{2a}a_{2m}}{2}.$$

Where k1a and k2a are gain adjustments applied by the described embodiments to the measured accelerometer gains. $k_{1a}$ and $k_{2a}$ are adaptively determined such that $k_{1a}=1/k_1$ and $k_{2a}=1/k_2$, as such $k_{1a}$ and $k_{2a}$ normalize the measured accelerometer outputs allowing them to be combined to accurately estimate both pure translational acceleration, $a_{T,est}$ and pure rotational acceleration, $a_{R,est}$.

When $a_T$ does note couple directly into PES, the feedforward signal is ideally entirely proportional to $a_{R,est}$. $a_{R,est}$ in turn is only sensitive to $a_R$ when the relative scaling between $a_{1m}$ and $a_{2m}$ is correct. This is true not only when $k_{1a}=1/k_1$ and $k_{2a}=1/k_2$, but also when $k_{1a}=k/k_1$ and $k_{2a}=k/k_2$. That is, as long as the relative scaling between $k_{1a}$ and $k_{2a}$ is correct, the feedforward signal based on $a_{R,est}$ is independent of $a_T$.

Figure 9:
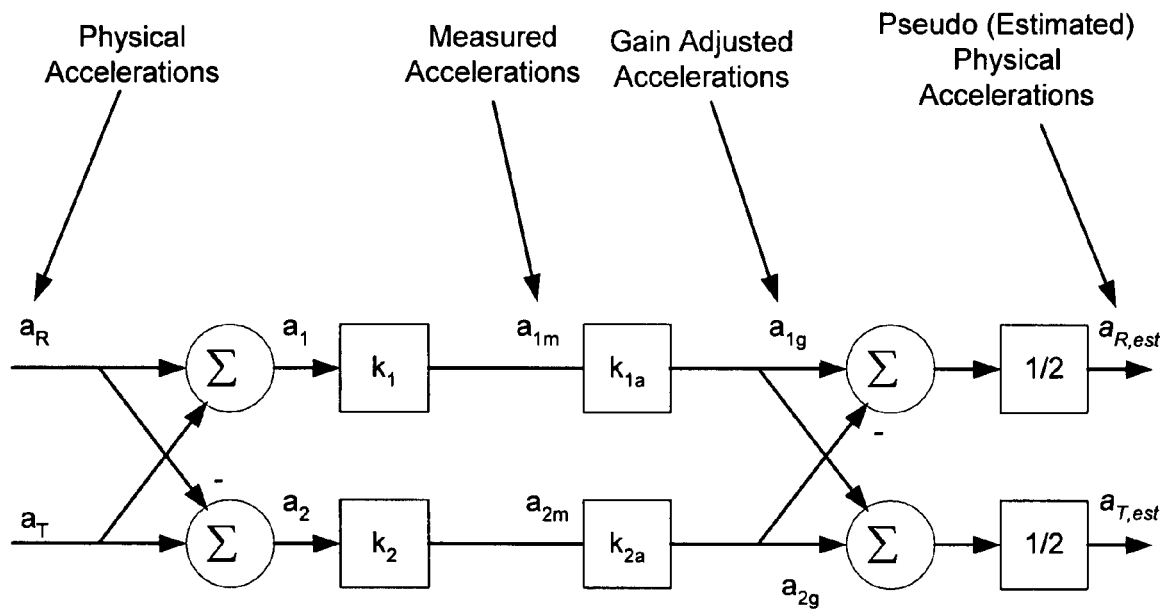
FIG. 9 shows an example of a block diagram that illustrates the relationships between the physical disturbances, measured disturbances and pseudo or estimated disturbances.

FIG. 9 shows an example of a block diagram that illustrates the relationships between the physical disturbances $a_R$, $a_T$, measured disturbances $a_{1m}$, $a_{2m}$ and pseudo or estimated disturbances $a_{R,est}$, $a_{T,est}$.

For the feedforward signal which is proportional to $a_{R,est}$:

$$a_{R,est} = \frac{k_{1a}a_{1m} - k_{2a}a_{2m}}{2}$$
$$= \frac{k_{1a}k_1 a_1 - k_{2a}k_2 a_2}{2}$$
$$= \frac{k_{1a}k_1(a_T + a_R) - k_{2a}k_2(a_T - a_R)}{2}$$
$$= \frac{(k_{1a}k_1 - k_{2a}k_2)}{2} a_T + \frac{(k_{1a}k_1 + k_{2a}k_2)}{2} a_R.$$

And therefore;

$$a_{R,est} = \frac{(k_{1a}k_1 - k_{2a}k_2)}{2} a_T + \frac{(k_{1a}k_1 + k_{2a}k_2)}{2} a_R.$$

It can be observed that the feedforward signal ($a_{R,est}$) includes both rotational acceleration and translational acceleration. However, if the gains are properly chosen, then the rotational component of the feedforward signal is maximized and the translational component is minimized. This is illustrated as well in FIG. 7 which shows that the rotational acceleration influences the position of the disk head over a track, and through the feedforward correction loop.

For completeness, it is worth noting:

$$a_{T,est} = \frac{k_{1a}a_{1m} + k_{2a}a_{2m}}{2}$$
$$= \frac{k_{1a}k_1 a_1 + k_{2a}k_2 a_2}{2}$$
$$= \frac{k_{1a}k_1(a_T + a_R) + k_{2a}k_2(a_T - a_R)}{2}$$
$$= \frac{(k_{1a}k_1 + k_{2a}k_2)}{2} a_T + \frac{(k_{1a}k_1 - k_{2a}k_2)}{2} a_R.$$

And therefore;

$$a_{T,est} = \frac{(k_{1a}k_1 + k_{2a}k_2)}{2} a_T + \frac{(k_{1a}k_1 - k_{2a}k_2)}{2} a_R.$$

As previously described, an embodiment includes matching the filters $N_1$ and $N_2$ to accelerometer responses $A_{C1}$, and $A_{C2}$, respectively and $K_{Ra}F_R$ to $F_{R,HDA}/P$. Thus, the output of the filtered accelerometer signals is matched in frequency characteristics to the response of the PES. FIG. 6 includes sensors (accelerometers) 632, 633 that have transfer functions $a_{C1}$, $a_{C2}$. Embodiments of the filters $N_1$ 634, $N_2$ 635 equalize these transfer functions. Ideally applying the filters allows the transfer function of the accelerometers 632, 633 to be ignored. Therefore, all that needs to be dealt with is the unknown gains of the accelerometers and the filter $K_{Ra}F_R$ which matches the frequency response of the feedforward loop with the frequency response of the drive loop.

Defining:

$$F_{1,T} = k_{1a}k_1 - k_{2a}k_2$$
$$F_{1,R} = k_{1a}k_1 + k_{2a}k_2,$$

and assuming that in a frequency range of interest;

$$N_1 \approx \frac{1}{A_{C1}},$$
$$N_2 \approx \frac{1}{A_{C2}}.$$

That is, in the frequency range of interest the filters $N_1$ and $N_2$ can be used to equalize the effects of the accelerometer dynamics $A_{C1}$ and $A_{C2}$. The rotational and translational filters $F_R$ and $F_T$ can be used to equalize $F_{HDA}$ and P by:

$$\frac{PES}{a_R} = \frac{F_{R,HDA}}{1+PC} - \frac{F_R F_{1,R} P}{1+PC}, \text{ and}$$

$$\frac{PES}{a_T} = -\frac{F_R F_{1,T} P}{1+PC},$$

where P and C are shown in FIG. 6.

The first equation describes the transfer function between PES and rotational acceleration, $a_R$ while the second equation describes the transfer function between PES and translational acceleration $a_T$.

The primary difference between previous two equations is that the first equation has $F_{R,HDA}$ in it, which reflects how much $a_R$ directly affects the PES. In this embodiment, the second equation does not have a corresponding $F_{T,HDA}$ which indicates a direct coupling between $a_T$ and PES. Instead, $F_{T,HDA}$ is so small as to be negligible and therefore ignored. This means that $a_T$ only affects PES when there is a mismatch between relative accelerometer gains that results in a parasitic component of the feedforward signal. The described embodiments utilizes $a_T$'s affect on PES to adjust the accelerometer gains $k_{1a}$ and $k_{2a}$ in order to minimize this affect.

Conditions in which the transfer functions between external accelerations and the PES are zero include:

$$\frac{PES}{a_T} = 0 \text{ if } F_{1,T} = k_{1a}k_1 - k_{2a}k_2 = 0, \text{ and}$$

$$\frac{PES}{a_R} = 0 \text{ if } \frac{F_{R,HDA}}{1+PC} - \frac{F_R F_{1,R} P}{1+PC} = \frac{F_{R,HDA} - F_R F_{1,R} P}{1+PC} = 0.$$

The first of these conditions indicates that the accelerometer gains are properly matched. The second of these conditions indicates that the overall rotational accelerometer gains are matched with the gains of the rotational acceleration being fed into the drive loop.

The matching condition that nulls the effect of $a_R$ on the PES includes matching both the magnitude and phase of $F_{R,HDA}$ with the fixed filter $F_R$, the scaled accelerometer signals $k_{1a}k_1 + k_{2a}k_2$, and the disk actuator model P. The scaled accelerometer signals only account for the gain matching condition. The filter $F_R$ can be considered to be an equalizer to match the phase of the effect of rotary acceleration on the disk drive with the feedforward signal.

Figure 10:
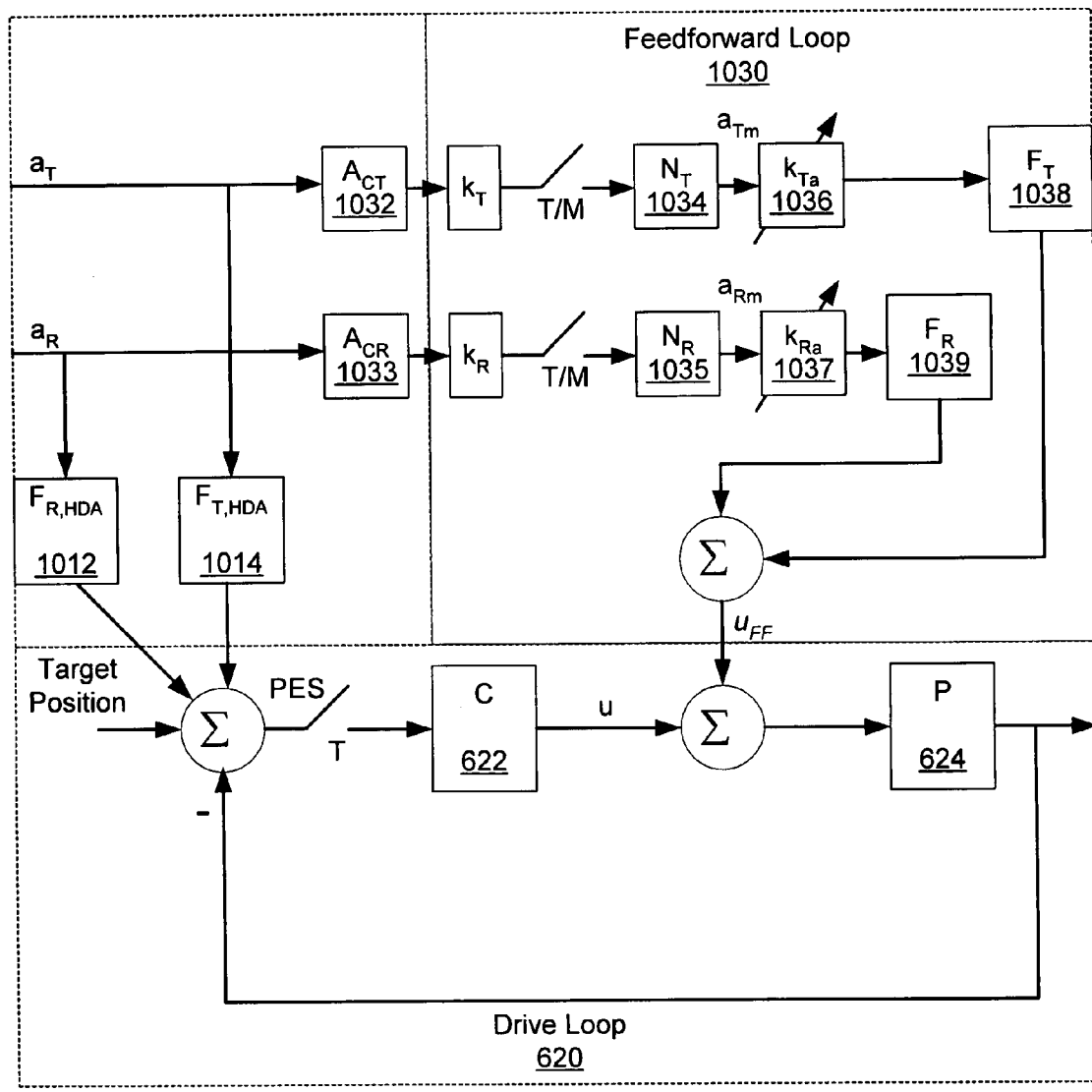
FIG. 10 shows an example of a block diagram of a disk drive control system that shows translational and rotational disturbance influencing the drive loop.

In some situations coupling of translational acceleration into the PES is not negligible. FIG. 10 shows an example of a block diagram of a disk drive control system that shows translational and rotational disturbance influencing the drive loop. A block 1012 depicts coupling of rotational disturbance into the PES, and a block 1014 depicts coupling of translational disturbance into the PES. The accelerometers 1032, 1033 are translational and rotational accelerometers, respectively. The feedforward loop 1030 includes filters $N_T$ 1034, $N_R$ 1035, gain elements $k_{Ta}$ 1036, $k_{Ra}$ 1037, filters $F_T$ 1038, $F_R$ 1039. In this simplified case, a pure rotational and a pure translational sensor are used, allowing the two effects of rotary and translational acceleration to be sensed and dealt with separately. The two responses are only combined to generate the feedforward signal $U_{FF}$.

As shown, in this embodiment, there is non-zero coupling of translational acceleration into PES even in the absence of the feedforward signal. This translational coupling, however, is generally lower than the rotational coupling due to the use of balanced rotary actuators in disk drives. Based on previous equations and FIG. 10, it can be shown that:

$$\frac{PES}{a_R} = \frac{F_{R,HDA}}{1+PC} - \frac{A_{CR}k_R N_R k_{Ra} F_R P}{1+PC} \text{ and}$$

$$\frac{PES}{a_T} = \frac{F_{T,HDA}}{1+PC} - \frac{A_{CT}k_T N_T k_{Ta} F_T P}{1+PC},$$

where $A_{CR}$ and $A_{CT}$ are the transfer functions of the accelerometers to rotational and translational acceleration respectively.

To cancel the effects of the accelerations on PES, the accelerometers need to be matched as previously described. The difference, however, is that the effects of $a_T$ are no longer solely due to a mismatch in the accelerometers' gains, but due to coupling in the drive. Generally, for disk drives with balanced rotary actuators, $F_{T,HDA}$ is significantly lower than $F_{R,HDA}$ over most frequencies of interest. This is typically determined by measuring the frequency responses from $a_R$ and $a_T$ to PES and examining the magnitude of these responses.

The matching conditions, that is, the values of gains and filters for which the sensitivity of PES to $a_R$ and $a_T$ can be minimized are:

$$\frac{PES}{a_R} = 0 \text{ if } \frac{F_{R,HDA}}{1+PC} = \frac{A_{CR}k_R N_R k_{Ra} F_R P}{1+PC} = 0, \text{ and}$$

$$\frac{PES}{a_T} = 0 \text{ if } \frac{F_{T,HDA}}{1+PC} = \frac{A_{CT}k_T N_T k_{Ta} F_T P}{1+PC} = 0.$$

Assuming that the feedback control loop running the drive is stable, a necessary condition for drive operation, the factor $$\frac{1}{1+PC}$$

is always finite, allowing the matching conditions to be simplified as:

$$F_{R,HDA} = A_{CR}k_R N_R k_{Ra} F_R P = (A_{CR} N_R F_R P)k_R k_{Ra} \text{ and}$$

$$F_{T,HDA} = A_{CT}k_T N_T k_{Ta} F_T P = (A_{CT} N_T F_T P)k_T k_{Ta}.$$

Again, there are multiple ways of adjusting the filters to achieve this condition. One such condition is to choose $N_R$ and $N_T$ to equalize the transfer functions of the accelerometers $A_{CR}$ and $A_{CT}$ in the frequencies of interest and choose $F_R$ and $F_T$ to adjust the feedforward to match the effects of $a_R$ and $a_T$ on PES. That is choose:

$$N_R \approx \frac{1}{A_{CR}} \text{ and } N_T \approx \frac{1}{A_{CT}}$$

to equalize the response of the accelerometers in the frequencies of interest. Then choose $$F_R = \frac{F_{R,HDA}}{P} \text{ and } F_T = \frac{F_{T,HDA}}{P},$$

then all that needs to be adapted is the gains $k_{Ra}$, $k_{Ta}$ to cancel the unknown gains $k_R$ and $k_T$. If it is assumed that the equalizing filters $N_R$ and $N_T$ cancel the unwanted dynamics of the accelerometers $A_{CR}$ and $A_{CT}$ and the filters $F_R$ and $F_T$ match the dynamics of the accelerometer feedforward signals to the response of the disk drive PES to $a_R$ and $a_T$, respectively, then the problem can be greatly simplified.

Figure 11:
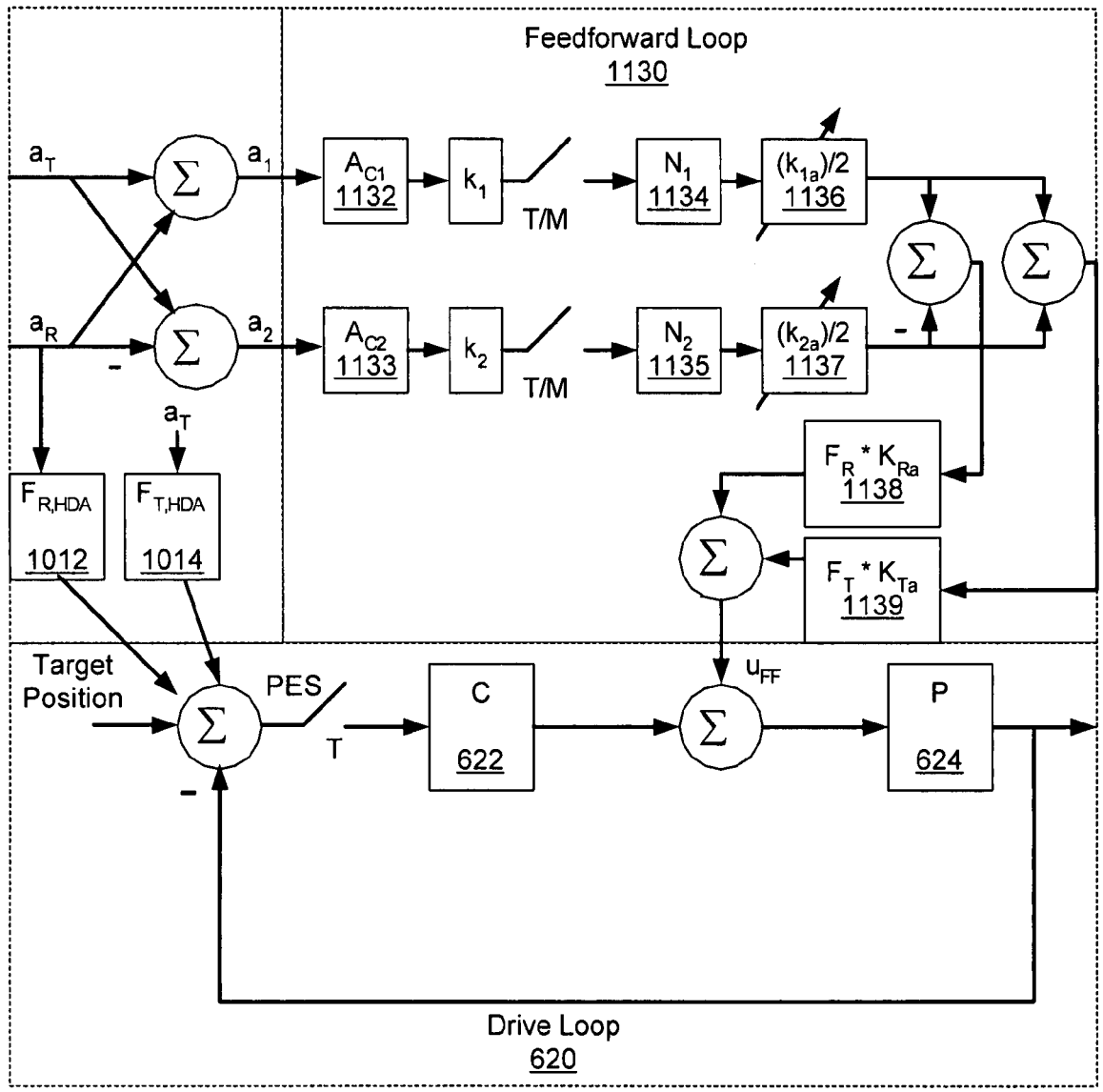
FIG. 11 shows an example of a block diagram of the disk drive control system that shows translational and rotational disturbances influencing the drive loop, and includes translational and rotational disturbances being estimated from a disturbance that has an unknown amount of rotational and translational components.

The situation is more difficult if the accelerometers are mismatched. FIG. 11 shows an example of a block diagram of the disk drive control system that shows translational and rotational disturbance influencing the drive loop, and includes translational and rotational disturbances being estimated from linear disturbances. FIG. 11 requires measurement of $a_1$, $a_2$ in place of $a_R$, $a_T$ by accelerometers $A_{C1}$ 1132, $A_{C2}$ 1133. The feedforward loop 1130 includes filters $N_1$ 1134, $N_2$ 1135, gain elements $k_{1a}$ 1136, $k_{2a}$ 1137, and filters $F_R K_{Ra}$ 1138, $F_T K_{Ta}$ 1139.

To obtain $$\frac{PES}{a_R}$$

it is assumed that $a_T = 0$. Then:

$$a_1 = a_T + a_R = a_R, \text{ and } a_2 = a_T - a_R = -a_R, \text{ and}$$

$$\frac{PES}{a_R} = \frac{F_{R,HDA}}{1+PC} - \left( A_{C1}k_1 N_1 \frac{k_{1a}}{2} + A_{C2}k_2 N_2 \frac{k_{2a}}{2} \right) \frac{K_{Ra} F_R P}{1+PC}.$$

As before, this can be simplified by first equalizing the accelerometer responses in the frequencies of interest by setting:

$$N_1 \approx \frac{1}{A_{C1}},$$

$$N_2 \approx \frac{1}{A_{C2}}.$$

In the event that the accelerometer gains are known, then these can be compensated through:

$$k_{1a} = \frac{1}{k_1},$$

$$k_{2a} = \frac{1}{k_2},$$

Usually, they are not and adjustments must be adapted to them.

Using the above filter settings, the previous equation can be simplified to:

$$\frac{PES}{a_R} = \frac{F_{R,HDA}}{1+PC} - \frac{K_{Ra} F_R P}{1+PC} \text{ and};$$

-continued $$\frac{PES}{a_R} = 0 \text{ if } \frac{F_{R,HDA}}{1+PC} = \frac{K_{Ra}F_R P}{1+PC}.$$

For a stable drive loop control system, $$\frac{1}{1+PC}$$

stays finite, so this condition simplifies to $$\frac{PES}{a_R} = 0 \text{ if } K_{Ra}F_R = \frac{F_{R,HDA}}{P}.$$

To get $$\frac{PES}{a_T}$$

it is assumed that $a_R$=0. Therefore;

$$a_1 = a_T + a_R = a_T, \text{ and}$$
$$a_2 = a_T - a_R = a_T, \text{ and}$$
$$\frac{PES}{a_T} = \frac{F_{T,HDA}}{1+PC} - \left(A_{C1}k_1N_1\frac{k_{1a}}{2} + A_{C2}k_2N_2\frac{k_{2a}}{2}\right)\frac{K_{Ta}F_T P}{1+PC}$$

which can be simplified using the same filter settings used for $$\frac{PES}{a_R}:$$

$$\frac{PES}{a_T} = \frac{F_{T,HDA}}{1+PC} - \frac{K_{Ta}F_T P}{1+PC}.$$

Therefore;

$$\frac{PES}{a_T} = 0 \text{ if } \frac{F_{T,HDA}}{1+PC} = \frac{K_{Ta}F_T P}{1+PC},$$

For a stable drive loop control system, $$\frac{PES}{a_T} = 0 \text{ if } K_{Ta}F_T = \frac{F_{T,HDA}}{P}.$$

stays finite, so this condition simplifies to $$\frac{1}{1+PC}$$

Note that there is a signal from the linear filters, and a signal for rotational and translational acceleration components. Therefore, one set of filters can be used to equalize and match the accelerometers, and another set can match the loop gains. The same conditions apply for equalizing the linear accelerometers. However, the matching of the feedforward is different because the coupling between $a_T$, $a_R$, and PES is different.

A linear system can be simplified through superposition when $a_T$, $a_R$ are nonzero. That is:

$$N_1 \approx \frac{1}{A_{C1}},$$
$$N_2 \approx \frac{1}{A_{C2}},$$
$$k_{1a} = \frac{1}{k_1},$$
$$k_{2a} = \frac{1}{k_2},$$

The individual accelerometers are equalized, and behave as a pure rotational or pure translational accelerometer. The following two equations can be used to calibrate the combined accelerometer responses to cancel the effect of disturbance.

$$K_{Ra}F_R = \frac{F_{R,HDA}}{P}, \text{ and}$$
$$K_{Ta}F_T = \frac{F_{T,HDA}}{P}.$$

To this point, the conditions needed for the feedforward to cancel rotational disturbances have been discussed. However, how to adapt the gains $k_{1a}$ and $k_{2a}$ to the proper levels has not been fully discussed. Once the equalizing filters have been properly set, then the gains should be adjusted to the point where:

$$k_{1a}k_1 = k_{2a}k_2.$$

For the standard situation in which $F_{T,HDA}$ is approximately zero, then the transfer function from the translational acceleration $a_T$ to the PES is approximately zero. In the situation in which $F_{T,HDA}$ is not zero, then matching the above equation provides cancellation of both rotational and translational acceleration. That is, the gains are adjusted such that the sense signals of the two accelerometers are equalized. The adaptation essentially includes two components. A first component decouples the translational acceleration from the feedforward signal. The second component operates much like adaptation using a pure rotational accelerometer.

Based on previous equations for filtering the accelerometer responses;

$$\frac{PES}{a_R} = \frac{F_{R,HDA}}{1+PC} - \left(\frac{k_1k_{1a}+k_2k_{2a}}{2}\right)\frac{K_{Ra}F_R P}{1+PC}.$$

Setting $k_{Ra} = 1$, and $$H_1 = \frac{F_{R,HDA}}{1+PC} = \frac{K_{Ra}F_R P}{1+PC}$$

and,

-continued $$\frac{PES}{a_R} = H_1\left[1 - \frac{k_1 k_{1a} + k_2 k_{2a}}{2}\right].$$

Similarly, with $F_{T,HDA}=0$, and $F_T=F_R$, then;

$$\frac{PES}{a_T} = -H_1\left[\frac{k_1 k_{1a} - k_2 k_{2a}}{2}\right].$$

Combining these results in:

$$PES = H_1\left[a_R - \frac{k_1 k_{1a} + k_2 k_{2a}}{2}a_R - \frac{k_1 k_{1a} - k_2 k_{2a}}{2}a_T\right].$$

A search algorithm such as a Least Means Squares (LMS) algorithm can be generated using some set of derivatives of a cost function. In the case of LMS, the cost function is quadratic, and the derivative is the gradient.

A gradient of PES can be derived as:

$$\frac{\partial PES}{\partial k_{1a}} = H_1\left[-\frac{k_1}{2}a_R - \frac{k_1}{2}a_T\right]$$
$$= -\frac{H_1}{2}k_1[a_R + a_T]$$
$$= -\frac{H_1}{2}k_1 a_1$$
$$= -\frac{H_1}{2}a_{1m}.$$

Likewise:

$$\frac{\partial PES}{\partial k_{2a}} = H_1\left[-\frac{k_2}{2}a_R - \frac{k_2}{2}a_T\right]$$
$$= -\frac{H_1}{2}k_2[a_R + a_T]$$
$$= -\frac{H_1}{2}k_2 a_2$$
$$= -\frac{H_1}{2}a_{2m}.$$

The filter $H_1$ filters all the signals, and therefore, does not change the adaptation. The filter represents a fixed filter that matches the frequency response of the feedforward signal to the PES signal. Note that the sign of the gradient with respect to $k_{2a}$ is opposite that of the gradient with respect to $k_{1a}$. This results in a difference in sign of the adaptation gain for the updates of $k_{2a}$ versus $k_{1a}$.

The adaptation for $k_{1a}$ and $k_{2a}$ is based on the two signals $a_{1m}=k_1 a_1$ and $a_{2m}=k_2 a_2$. However, $k_1$ and $k_2$ are unknown, so their effect should be decoupled from the PES. Based on the negative of the gradient, a parameter update is:

$$k_{1a}(i+1)=k_{1a}(i)+2\mu_1 PES(i)a_{1m}(i)$$

$$k_{2a}(i+1)=k_{2a}(i)-2\mu_2 PES(i)a_{2m}(i)$$

where $\mu_1$ and $\mu_2$ are adaptation gains and control both the stability of the adaptation loop as well as the speed of convergence.

Figure 12A:
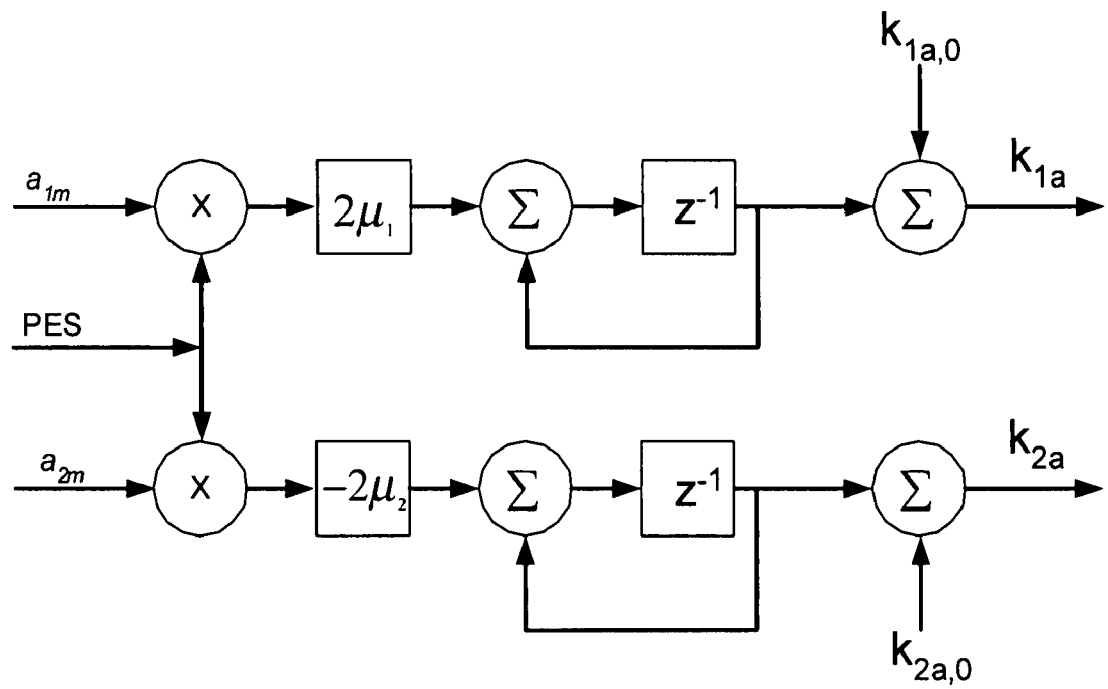
FIG. 12A shows another example of the adaptive gain control.

The sign difference in the two equations is based on the fact that the gradient from the measured acceleration $a_{1m}$ to PES has a different sign than that of the measured acceleration $a_{2m}$ to the PES. FIG. 12A shows an example of the adaptive gain control that depicts these equations. FIG. 12A shows a Least Mean Squares (LMS) algorithm for adapting $a_{1m}$ and $a_{2m}$. Each of the inputs from the accelerometers is multiplied by PES. The products are scaled by the respective adaptation gains, $2\mu_1$ or $-2\mu_2$, and then fed into cumulative sums. The $z^{-1}$ block is a unit time delay, which when put into a positive feedback loop implements a digital integrator. Thus, when the scaled products of the acceleration are fed into the positive feedback loops, these scaled products are integrated. Thus, over time, the integrators compute a gain that is proportional to the correlation of each of the accelerometer signals to PES.

In the presence of translational acceleration, it can be better to rearrange $a_{1m}$ and $a_{2m}$ generating a new set of signals. For example, let:

$$a_{T,est} = \frac{k_{1a}}{2}\left(a_{1m} + \frac{k_{2a}}{k_{1a}}a_{2m}\right) \text{ and}$$

$$a_{R,est} = \frac{k_{1a}}{2}\left(a_{1m} - \frac{k_{2a}}{k_{1a}}a_{2m}\right).$$

Setting $k_{3a} = \frac{k_{2a}}{k_{1a}}$, these can be rewritten:

$$a_{T,est} = \frac{k_{1a}}{2}(a_{1m} + k_{3a}a_{2m}) \text{ and}$$

$$a_{R,est} = \frac{k_{1a}}{2}(a_{1m} - k_{3a}a_{2m}).$$

These parameters can be adapted in a similar way as previously described, or by multiplying the PES with these estimated accelerations forming an update. That is, assuming the gain mismatch is not too large, a simple version of an adaptation includes a simple LMS adaptation, such as:

$$k_{1a}(i+1)=k_{1a}(i)+2\mu_R PES(i)a_{R,est}(i)$$

$$k_{3a}(i+1)=k_{3a}(i)-2\mu_T PES(i)a_{T,est}(i).$$

Figure 12B:
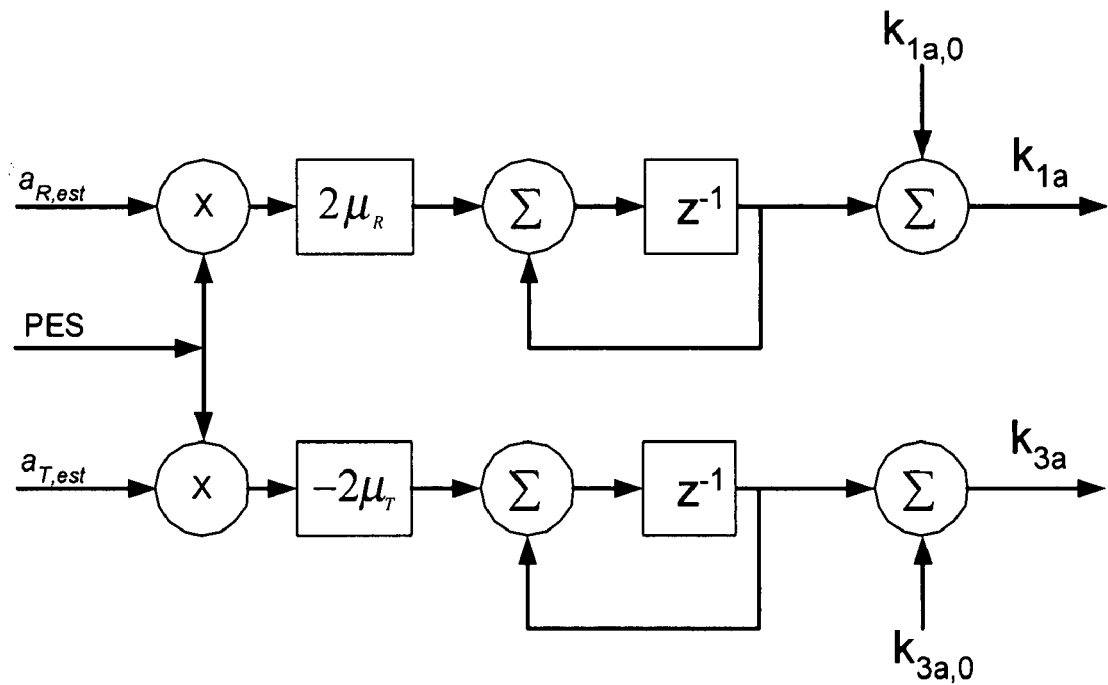
FIG. 12B shows another example of the adaptive gain control.

FIG. 12B shows another example of the adaptive gain control that depicts adaptation according to the equations above. The sign difference between the two equations is due to the fact that the gradient of the measured acceleration $a_{1m}$ to the PES has a different sign than the measured acceleration $a_{2m}$ to the PES.

Figure 13A:
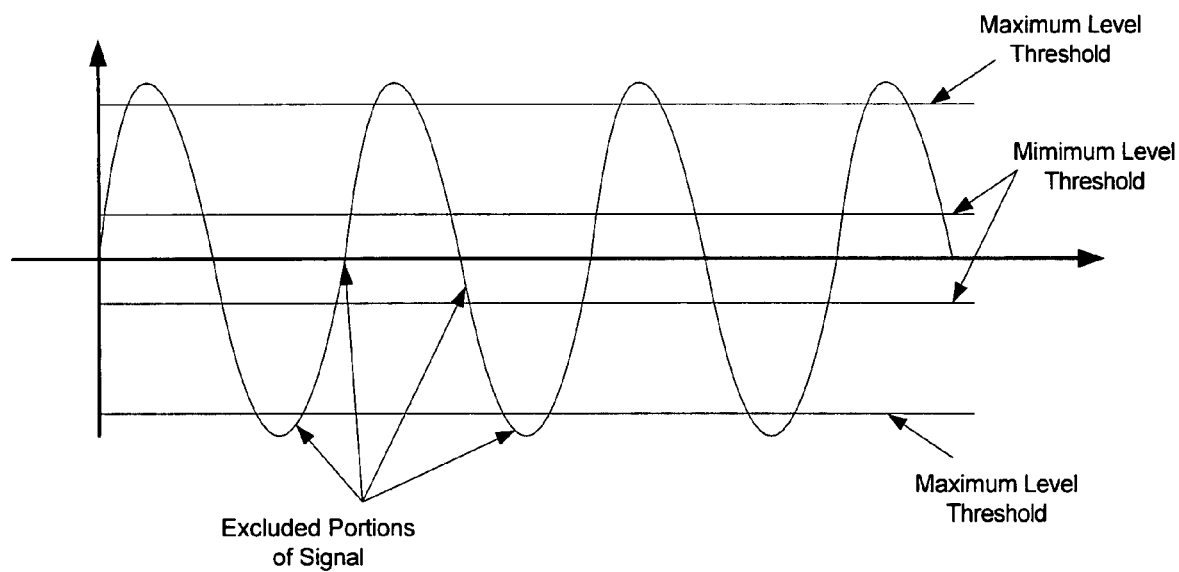
FIG. 13A shows an example of a sine wave, and the effects of threshold detection.

Some methods of using disturbance sensors for reducing the effects of disturbances of a disk drive only use disturbance signals generated by the disturbance sensors if the disturbance signals exceed a predetermined threshold. For example, FIG. 13A shows an example of a sine wave (representing a detected disturbance signal), and the effects of threshold detection applied to that detected disturbance signal. However, as shown, portions of the sine wave are excluded even though the disturbance signal could be helpful in the excluded portions. That is, the excluded portions include perfectly valid values of a sine wave, wherein the amplitude of the sine wave exceeds the threshold boundaries. It can be observed that even for reasonable signal amplitudes, the threshold (minimum) eliminates a valid portion of the disturbance signal that lies below the minimum level threshold. Additionally, some implementations include a maximum threshold level which can cause the top portions of the disturbance signals to be unused. Using such a simple thresholding scheme on the disturbance signal to turn adaptation or feedforward on and off, disables portions of a signal that contain useful information.

Figure 13B:
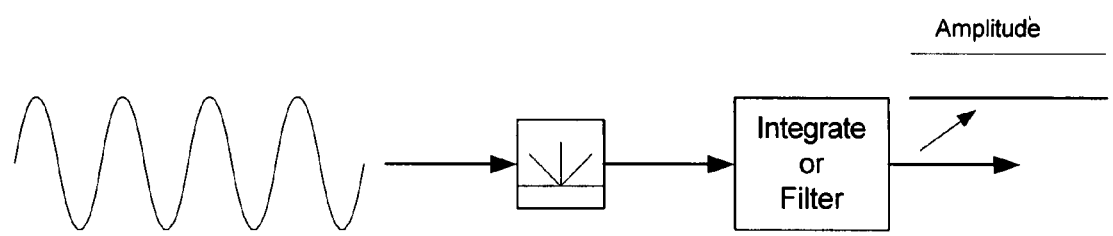
FIG. 13B shows an example of a threshold detection circuit.

A more advanced method of thresholding allows for adaptation and/or feedforward correction to continue even when portions of the disturbance signal are beyond the threshold values. FIG. 13B shows an example of such a threshold detection circuit. This simple rectifying and low pass filter provides an amplitude representation of the disturbance signal. The amplitude of this signal is constant and non-trivial. This threshold detection circuit allows adaptation and/or feedforward to continue, even when the signal is outside the threshold levels such as during short periods of time when the large signal passes through 0 and is below the minimum threshold. This simple method prevents the loss of useful signal information for the algorithms of the described embodiments to process.

Although specific embodiments have been described and illustrated, the embodiments are not to be limited to the specific forms or arrangements of parts so described and illustrated.

What is claimed:

1. A method of mitigating effects of disturbances of a disk drive, comprising:
   sensing a position error signal of a transducer coupled to a surface of the disk drive, the position error signal aiding in control of an actuator of the disk drive;
   generating a first disturbance signal by sensing a disturbance of a first sensor attached to the disk drive, the first disturbance signal aiding in control of the actuator;
   generating a second disturbance signal by sensing a disturbance of a second sensor attached to the disk drive, the second disturbance signal aiding in control of the actuator;
   reducing effects of the disturbances on the position error signal by adaptively adjusting a gain of the first disturbance signal and a gain of the second disturbance signal; comprising;
      estimating a rotational component of the first and second disturbance signals;
      estimating a translational component of the first and second disturbance signals;
      adaptively adjusting a gain of the first disturbance signal and a gain of the second disturbance signal in response to an estimated rotational component of the first and second disturbance signals as separated from an estimated translational component of the first and second disturbance signals as determined by a response of the position error signal to the disturbances;
      detecting average amplitudes of the first and second disturbance signals;
      adaptively adjusting gains of the first and disturbance signals only when the detected average amplitudes are within a specified range;
      rectifying the first and second disturbance signals; and
      low-pass filtering the rectified first and second disturbance signals.

2. The method of claim 1, wherein
at least one of the first and second disturbance signals is sampled at a different rate than a sampling rate of the disk drive position error signal.

3. The method of claim 1, further comprising:
generating an auxiliary control signal by combining the first disturbance signal and the second disturbance signal;
injecting the auxiliary control signal into a drive control loop of the disk drive for aiding in control of the actuator.

4. The method of claim 3, further comprising:
detecting estimated amplitudes of the first and second disturbance signals;
injecting the auxiliary control signal into a drive control loop of the disk drive only when the estimated amplitudes are within a specified range.

5. The method of claim 1, further comprising:
reducing effects of translational disturbances on the position error signal by adjusting a relative gain between the first disturbance signal and the second disturbance signal.

6. The method of claim 1, further comprising:
reducing effects of rotational disturbances on the position error signal by adjusting an overall gain of the first disturbance signal and the second disturbance signal.

7. The method of claim 1, further comprising:
adaptively adjusting the gain of the first disturbance signal by monitoring an output of the first sensor;
adaptively adjusting the gain of the second disturbance signal by monitoring an output of the second sensor.

8. The method of claim 1, wherein the first sensor comprises a first accelerometer sensing a first acceleration and the second sensor comprises a second accelerometer sensing a second acceleration, and the method further comprises:
   estimating the rotational acceleration signal from the first acceleration signal and the second acceleration signal;
   estimating the translational acceleration signal from the first acceleration signal and the second acceleration signal; and wherein
   reducing effects of the disturbances on the position error signal comprises;
      de-correlating the position error signal with respect to the rotational disturbance and translational disturbance comprises adaptively adjusting the gain of the first acceleration signal and adaptively adjusting the gain of the second acceleration signal.

9. The method of claim 8, further comprising:
generating an auxiliary control signal by combining the first acceleration signal and the second acceleration signal, wherein combining comprises a scaled combination of the first acceleration signal and the second acceleration signal, and the translational acceleration is estimated based on the scaled combination of the first acceleration signal and the second acceleration signal;
injecting the auxiliary control signal into a drive control loop of the disk drive for aiding in control of the actuator.

10. The method of claim 8, wherein the rotational acceleration signal is estimated based on a scaled combination of the first acceleration signal and the second acceleration signal, and the translational acceleration is estimated based on a scaled combination of the first acceleration signal and the second acceleration signal.

11. The method of claim 1, further comprising matching a response of the position error signal to the first and second disturbance signals by filtering the first and second disturbance signals of the first and second sensor before the first and second disturbance signals are gain adjusted.

12. The method of claim 1, wherein the first and second disturbance signals aid in control of the actuator through an adaptive feedforward control loop, and the position error signal aids in control of the actuator through a feedback control loop.

13. The method of claim 1, wherein an adaptive feedforward control loop of the disk drive is implemented with analog circuitry.

14. A method of calibrating at least a pair of sensors of a disk drive, comprising:
- sensing a position error signal of a transducer coupled to a surface of the disk drive, the position error signal aiding in control of an actuator of the disk drive;
- generating a first disturbance signal by sensing a disturbance of a first sensor attached to the disk drive, the first disturbance signal aiding in control of the actuator;
- generating a second disturbance signal by sensing a disturbance of a second sensor attached to the disk drive, the second disturbance signal aiding in control of the actuator;
- adaptively adjusting a relative gain between the first disturbance signal and the second disturbance signal to minimize a difference between a gain associated with the first disturbance signal, and a gain associated with the second disturbance signal; and
- measuring a response of the position error signal;
- rectifying and filtering at least one of the first disturbance signal and the second disturbance signal;
- detecting if the at least one rectified and filtered signal exceeds a threshold, and
- if the signal exceeds the threshold, then decoupling the first disturbance signal and the second disturbance signal from control of the actuator.

15. The method of claim 14, wherein adaptively adjusting a relative gain between the first disturbance signal and the second disturbance signal, further comprises:
- adjusting the gain of the first disturbance signal to minimize its correlation with the position error signal; and
- adjusting the gain of the second disturbance signal to minimize its correlation with the position error signal.

16. The method of claim 14, further comprising:
- estimating a rotational disturbance signal by combining the first disturbance signal and the second disturbance signal;
- canceling effects of rotational disturbance by aiding control of the actuator with the estimated rotational disturbance signal, comprising:
  - scaling the estimated rotational disturbance signal; and
  - summing the scaled estimated rotational signal into a control loop of the disk drive.

17. The method of claim 14, further comprising:
- generating a translational disturbance signal by combining the first disturbance signal and the second disturbance signal;
- aiding in canceling effects of translational disturbance by aiding control of the actuator with the translational disturbance signal.

18. The method of claim 14, further comprising:
- gain adjusting the first disturbance signal and gain adjusting the second disturbance signal, and
- de-correlating the position error signal with respect to the first disturbance signal and the second disturbance signal by adaptively adjusting the gain of the first disturbance signal and adaptively adjusting the gain of the second disturbance signal.

19. The method of claim 14, wherein the first disturbance signal and the second disturbance signals aid in control of the actuator through an adaptive feedforward control loop, and the position error signal aids in control of the actuator through a feedback control loop.

20. The method of claim 14, wherein an adaptive feedforward control loop of the disk drive is implemented with analog circuitry.

21. The method of claim 14, wherein the first sensor and the second sensor are aligned on a common translational axis, and sense translational disturbance.

22. The method of claim 14, further comprising:
- detecting estimated amplitudes of the first disturbance signal and the second disturbance signal;
- adaptively adjusting the gain of the first disturbance signal and the gain of the second disturbance signal only when the estimated amplitudes are within a specified range.

23. The method of claim 14, wherein at least one of the first and second disturbance signals is sampled at a different rate than a sampling rate of the disk drive position error signal.

24. The method of claim 14, further comprising:
- detecting average amplitudes of the first and second disturbance signals;
- injecting an auxiliary control signal into a drive control loop of the disk drive only when the average amplitudes are within a specified range.

25. A method of calibrating at least a pair of sensors of a disk drive, comprising:
- sensing a position error signal of a transducer coupled to a surface of the disk drive, the position error signal aiding in control of an actuator of the disk drive;
- generating a first disturbance signal by sensing a disturbance of a first sensor attached to the disk drive, the first disturbance signal aiding in control of the actuator;
- generating a second disturbance signal by sensing a disturbance of a second sensor attached to the disk drive, the second disturbance signal aiding in control of the actuator;
- adaptively adjusting a relative gain between the first disturbance signal and the second disturbance signal to minimize a difference between a gain associated with the first disturbance signal, and a gain associated with the second disturbance signal; and
- measuring a response of the position error signal;
- detecting estimated amplitudes of the first and second disturbance signals;
- adaptively adjusting gains of the first and disturbance signals only when the detected estimated amplitudes are within a specified range;
- wherein detecting the average amplitudes comprises:
  - rectifying the first and second disturbance signals; and
  - low-pass filtering the rectified first and second disturbance signals.

* * * * *